(12) United States Patent
Myojo et al.

(10) Patent No.: US 7,077,351 B2
(45) Date of Patent: Jul. 18, 2006

(54) DUAL-BEARING REEL

(75) Inventors: Seiji Myojo, Sakai (JP); Akira Nago, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/656,137

(22) Filed: Sep. 8, 2003

(65) Prior Publication Data

US 2004/0075005 A1 Apr. 22, 2004

Related U.S. Application Data

(63) Continuation-in-part of application No. 10/237,611, filed on Sep. 10, 2002, now abandoned.

(30) Foreign Application Priority Data

Oct. 19, 2001 (JP) ............................. 2001-321593
Jun. 26, 2003 (JP) ............................. 2003-183259

(51) Int. Cl.
*A01K 89/01* (2006.01)
(52) U.S. Cl. ...................... 242/310; 242/312
(58) Field of Classification Search ................ 242/310, 242/311, 312
See application file for complete search history.

(56) References Cited

U.S. PATENT DOCUMENTS

| | | | |
|---|---|---|---|
| 4,807,827 A | | 2/1989 | Welch |
| 4,905,930 A | * | 3/1990 | Puryear et al. ............. 242/312 |
| 5,308,019 A | * | 5/1994 | Karlsson ..................... 242/279 |
| 5,377,925 A | * | 1/1995 | Miyazaki .................... 242/312 |
| 5,482,220 A | * | 1/1996 | Hashimoto .................. 242/279 |
| 5,601,246 A | * | 2/1997 | Takahashi ................... 242/261 |
| 5,816,518 A | * | 10/1998 | Miyazaki .................... 242/310 |
| 6,032,894 A | * | 3/2000 | Chapman et al. ........... 242/310 |
| 6,199,782 B1 | * | 3/2001 | Oishi .......................... 242/312 |
| 6,209,816 B1 | * | 4/2001 | Hitomi et al. .............. 242/322 |
| 6,254,022 B1 | * | 7/2001 | Katayama ................... 242/310 |

* cited by examiner

*Primary Examiner*—Emmanuel M Marcelo
(74) *Attorney, Agent, or Firm*—Shinjyu Global IP Counselors

(57) ABSTRACT

A dual bearing reel includes a basic unit and a cover portion. The basic unit includes a spool, a spool driving mechanism, and a reel body. The reel body includes a main frame having first and second side plates that are spaced apart from each other, and connectors linking the first and second side plates, and third and fourth side plates each detachably mounted to the main frame. The spool and spool driving mechanism are installed in the main frame so as to function in cooperation with each other. The cover portion includes first and second cover members each detachably mounted to the reel body so as to cover the exteriors of the third and fourth side plates. More flexible ornamental design of dual bearing reel is possible while securing its indispensable functions. Also, a common part, which can be used in dual bearing reels of other models, is established.

22 Claims, 14 Drawing Sheets

DUAL-BEARING REEL

This is a continuation-in-part application of application Ser. No. 10/237,611, filed on Sep. 10, 2002 now abandoned, which claims foreign priority of Japanese Patent Application 2001-321593, filed on Oct. 19, 2001.

BACKGROUND OF THE INVENTION

1. Field of the Invention

This invention generally relates to fishing reels. More specifically, the present invention relates to a dual bearing reel that is mounted on a fishing rod and winds fishing line around an axis that is perpendicular to the fishing rod.

2. Background Information

A dual bearing reel generally includes a reel body, which freely allows reeling-out and winding of the fishing line, and a handle for performing a winding operation of the fishing line.

The reel body accommodates a spool for winding the fishing line, a spool driving mechanism for rotating the spool, a drag mechanism for restricting the reeling out of the fishing line, and a level winding mechanism for winding the fishing line uniformly on the spool while the fishing line is wound. The spool driving mechanism includes a clutch mechanism that switches the spool between a freely rotatable state and a line winding state. The spool driving mechanism is formed such that a handle can be coupled thereto. In addition, the drag mechanism that brakes the rotation of the spool in the line reel-out direction is provided along the spool driving mechanism. Furthermore, a brake mechanism for preventing spool backlash during casting is provided. The handle is disposed on a position that projects outward from the reel body, in order to allow easy operation of the handle.

The reel body includes a main frame and a pair of cover members. The main frame includes a pair of side plates and connecting members that connect both side plates. The pair of cover members covers the exteriors of both side plates. In conventional dual bearing reels, the spool is provided between both side plates, and the handle shaft on which the handle is mounted is mounted on one side plate and one cover member. In addition, the spool driving mechanism is provided between the cover member and the side plate on the side in which the handle is mounted. The spool driving mechanism (which includes the clutch mechanism) and the drag mechanism are positioned and supported by the cover member and the side plate on the side in which the handle is mounted. In addition, the brake mechanism is mounted between the side plate and the cover member that are on the side opposite the side in which the handle is mounted. Furthermore, the level winding mechanism is provided between both side plates. The brake mechanism and the level winding mechanism are also positioned and supported on the side plates and cover plates. Thus, the dual bearing reel is a structure that functions as a whole.

In the aforementioned conventional dual bearing reel, a pair of cover members is mounted on the outer sides of the main frame. These cover members serve to establish the outer appearance of the dual bearing reel, but the cover members also position and support various mechanisms because they are mounted on the main frame. In other words, both the main frame and the cover members cooperatively position and support the spool, the spool driving mechanism, the level winding mechanism, and the brake mechanism. Thus, the dual bearing reel is a structure that functions as a whole.

Due to such structure of the dual bearing reel, the design of the cover members needs to take into consideration the following requirements. First of all, portions of the cover members that support the spool have to be shaped so as to have enough strength to support the spool. Also, the position of the spool-support portion has to be determined based on the position of the spool. Furthermore, a portion that supports the handle has to be shaped so as to have sufficient strength to hold a bearing. Furthermore, since the cover members are mounted on the main frame, their engagement portions need to be formed with a high precision.

On the other hand, since the sub frame also functions as the surface of the dual bearing reel, the sub frame needs to have not only the functionality, but also a good ornamental design. Otherwise, the commercial value of the dual bearing reel will be compromised.

Therefore, there has not been much flexibility in the design of cover member due to various functional constraints of the dual bearing reel. As a result, it has been very difficult if not impossible to establish common parts for use in different models, while providing the ornamental designs of users' preference and maintaining the functions of the dual bearing reel at the same time. Accordingly, the manufacturing costs tended to be higher.

In view of the above, there exists a need for a dual bearing reel which overcomes the above mentioned problems in the prior art. This invention addresses this need in the prior art as well as other needs, which will become apparent to those skilled in the art from this disclosure.

SUMMARY OF THE INVENTION

An object of the present invention is to provide a dual bearing reel that has flexibility in its ornamental design and that can use common parts which can be used in other models, while securing the indispensable functions of the dual bearing reel.

To achieve the aforementioned objects, the inventor of the present invention focused on the fact that it is effective to separate a member that positions and supports functional members such as the spool and the spool driving mechanism, which are indispensable in the dual bearing reel, from a member that functions as a surface, instead of using as an outer plate of the dual bearing reel the member that supports and positions the functional members.

The dual bearing reel in accordance with the present invention includes a basic unit and a spool and an outer plate portion. The basic unit includes a spool for winding or reeling out a fishing line by being rotated in normal or reverse direction, a spool driving mechanism for driving the spool, and an attachment frame to which the spool and the spool driving mechanism are attached such that the spool and the spool driving mechanism can function in cooperation with each other. The outer plate portion is attached to the attachment frame of the basic unit.

In this structure, the spool and the spool driving mechanism are attached to the attachment frame such that they function in cooperation with each other. In other words, the spool and the spool driving mechanism are installed in the attachment frame.

By installing the spool and the spool driving mechanism in the attachment frame, the attachment frame, the spool, and the spool driving mechanism can form a unit that by itself has all the indispensable functions of the dual bearing reel. By attaching the outer plate member to the attachment frame, the surface of the dual bearing reel can be formed.

In other words, the dual bearing reel of the present invention omits the sub frame, while the sub frame has been used in conventional dual bearing reels as an outer plate to form the surface as well as to support the spool and the drag mechanism such that they function together. Instead, the dual bearing reel of the present invention has the attachment frame which supports and positions the functional members such as the spool such that they function in cooperation with each other, with the surface being formed solely by the outer plate members. Accordingly, the outer plate member does not need to perform functions such as supporting the spool and positioning the spool driving mechanism. Therefore, there is no restriction on the design of the outer plate members due to functional requirements as has been the case with conventional dual bearing reels. The outer plate members can be designed freely as ornamental parts.

Preferably, the basic unit of the dual bearing reel further includes a braking mechanism for applying a brake to the rotation of the spool, and a level winding mechanism for winding the fishing line uniformly on the spool. The braking mechanism and the level winding mechanism can be attached to the attachment frame such that the braking mechanism and the level winding mechanism function in cooperation with each other.

In this manner, it is possible to achieve a favorable casting with the braking mechanism by preventing a backlash at the time of casting. The level winding mechanism winds the fishing line favorably by arranging the fishing line uniformly on the spool. Furthermore, since these members such as the braking member are installed in the attachment frame, the outer plate member does not need to perform functions such as supporting the spool and positioning the spool driving mechanism. Accordingly, there is no restriction on the design of the outer plate member due to functional requirements as has been the case with conventional dual bearing reels. The outer plate members can be designed freely as ornamental parts.

The outer plate member can be fixedly coupled through a coupling structure. The outer plate member can be fixedly engaged using an engagement member.

The reason why such attachment structure can be employed is because the surface of the dual bearing reel is solely formed by the outer plate member, and because there is no requirement for precision and solidness of attachment as in the case of conventional dual bearing reels. By employing such attachment structure, attachment of the outer plate member is made very easy.

Particularly, by making the outer plate member from ABS resin, it is possible to apply coating and plating easily. Accordingly, it is possible to manufacture outer plate members in various shapes at a low cost.

The dual bearing reel according to the seventeenth aspect of the present invention is a reel that is mounted to a fishing rod, and winds fishing line around an axis that is perpendicular to the fishing rod to take up fishing line, and includes a basic unit and a cover portion. The basic unit includes a spool for taking up fishing line, a spool driving mechanism for braking the rotation of the spool, and an installation frame. The installation frame includes a main frame that is mounted to the fishing rod and includes first and second side plates that are spaced apart from each other and have the spool mounted therebetween and a plurality of connectors that link the first and second side plates together, and third and fourth side plates that are each detachably mounted on the outer sides of the first and second side plates. The spool and the spool driving mechanism are installed in the installation frame such that the spool and the spool driving mechanism function in cooperation with each other. The cover portion include first and second cover members that are each detachably mounted to the installation frame such that the first and second cover members cover the exteriors of the third and fourth side plates.

In this dual bearing reel, the spool and the spool driving mechanism that carry out at least the basic functions of the dual bearing reel are installed such that the spool and the spool driving mechanism function in cooperation with each other. This installation frame includes a main frame that includes the first and second side plates, and third and fourth side plates that are each detachably installed on the exteriors of the first and second side plates of the main frame. Because of this construction, the spool and the spool driving mechanism can be installed such that the spool and the spool driving mechanism are supported and positioned on the first and third side plates and the second and fourth side plates, and in a state in which the spool and spool driving mechanism function in cooperation with each other, by replacing the cover members on a conventional dual bearing reel with the third and fourth side plates and separately mounting the first and second side plates and the third and fourth side plates. Because of this, the basic functions of a dual bearing reel, such as winding fishing line around the spool and releasing fishing line from the spool, are made possible, when the spool and the spool driving mechanism are installed on the installation frame. The exterior appearance of the dual bearing reel is determined by mounting a decorative cover portion having first and second cover members mounted on the third and fourth side plates of the installation frame. Here, by providing third and fourth side plates on the installation frame instead of conventional cover members that are mounted to the exterior of the main frame having first and second side plates, it is possible to support and position a spool and spool driving mechanism that perform the basic operations of a dual bearing reel on the installation frame. Because of this, the first and second cover members do not need to perform functions such as supporting the spool and positioning the spool driving mechanism. Accordingly, there will be no additional limitations on the design as in the case of the prior art. Thus, it is possible to freely design the first and second cover members as decorative design components. Thus, the important functions of the dual bearing reel can be retained by the basic unit, while the decorative design of the dual bearing reel can be freely and easily fulfilled by the cover portions. In addition, it is possible to create a plurality of different types of decorative designs by simply changing the decorative design of the cover portions. Furthermore, it is possible to establish the basic unit as a commonly-shared component that can be used among different types of reels.

The dual bearing reel according to the eighteenth aspect of the present invention is the reel as set forth in the seventeenth aspect, in which the spool driving mechanism includes a rotation transmission mechanism that includes a handle shaft on an end of which a handle is mounted, a clutch mechanism arranged operatively between the handle and the spool, and a clutch switching mechanism configured to switch the clutch mechanism between a clutch-off state and a clutch-on state. The rotation of the handle is transmitted to the spool by the rotation transmission mechanism. The clutch mechanism is configured to switch the spool between a freely rotatable state and a line winding state. While the clutch mechanism is in the clutch-off state, the spool is in the freely rotatable state. While the clutch mechanism is in the clutch-on state, the spool is in the line winding state. The spool driving mechanism includes a clutch mechanism that switches the spool between a freely rotatable state and a line winding state, and a clutch switching mechanism that can switch the clutch mechanism between a clutch-off state in which the spool can freely rotate and a clutch-on state in which the spool is in the line-winding state and can take up fishing line. Here, it will be easy to reel out fishing line from the spool because the clutch mechanism is provided in the spool driving mechanism.

The dual bearing reel according to the nineteenth aspect of the present invention is the reel as set forth in the seventeenth or eighteenth aspects, in which the basic unit further includes a drag mechanism that brakes the rotation of the spool when the spool rotates to reel out the fishing line, and a level winding mechanism for winding fishing line in an orderly manner on the spool. The drag mechanism and the level winding mechanism are installed on the installation frame such that the drag mechanism and level winding mechanism function in cooperation with each other. Here, the tension applied to the fishing line can be controlled by the drag mechanism, and the fishing line can be uniformly wound around the spool by the level winding mechanism.

The dual bearing reel according to the twentieth aspect of the present invention is the reel disclosed in any of the seventeenth through nineteenth aspects of the invention, in which the basic unit further includes a brake mechanism that brakes the spool regardless of the direction in which the spool rotates. The brake mechanism is mounted between the first side plate and the third side plate of the basic unit. Here, backlash during casting can be prevented by the brake mechanism.

A dual-bearing reel according to twenty-first aspect of the present invention is the reel described in any of the seventeenth through twentieth aspects of the invention, in which the second side plate and the fourth side plate are disposed with a space which accommodates the spool driving mechanism being formed therebetween. Here, the spool driving mechanism can be compactly disposed because the spool driving mechanism can be disposed between the two side plates.

The dual bearing reel according to the twenty-second aspect of the present invention is the reel disclosed in any of the seventeenth through twenty-first aspect of the invention, in which the cover portion further includes a front cover that covers the side of the reel opposite the side to which the fishing rod is mounted. Here, the decorative design of the front side of the installation frame can be improved, and the front cover can be used as a thumb rest when thumbing the fishing line.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

First Embodiment

Figure 1:
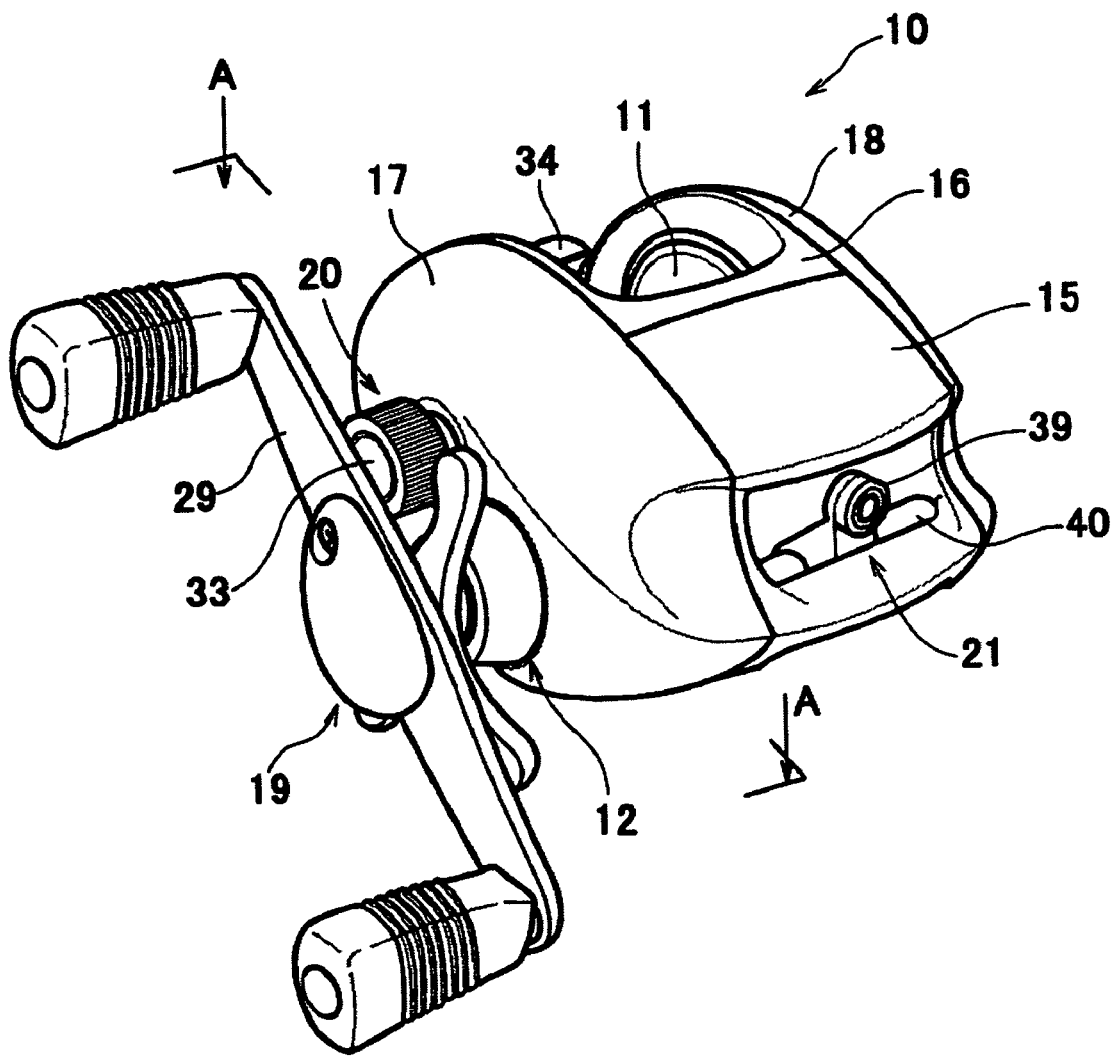
FIG. 1 is a perspective view of the dual bearing reel in accordance with a first embodiment of the present invention.

FIG. 1 is a perspective view of a dual bearing reel 10 in accordance with a first embodiment of the present invention.

Referring to FIG. 1, the dual bearing reel 10 has a spool 11 and a spool driving mechanism 19 for driving the spool 11 disposed within an attachment frame 13 (see FIG. 2) which will be described below. The spool 11 and the spool driving mechanism 19 are functional members that are indispensable for the dual bearing reel 10. In this manner, a basic unit 14, which has all the indispensable functions of the dual bearing reel 10, is structured. Then, outer plate members 15–18, which function as the surface of the dual bearing reel 10, are attached to the basic unit 14. The dual bearing reel 10 having a superior design can be formed in this manner.

In other words, the first through fourth outer plate members 15–18, which will be described later, are used solely for the purpose of creating the appearance of the dual bearing reel 10. In this manner, the basic design of the functions of the dual bearing reel 10 can be made easier. At the same time, a greater flexibility can be achieved in the ornamental design of the appearance of the dual bearing reel 10. A detailed description of the dual bearing reel 10 is as follows.

Figure 2:
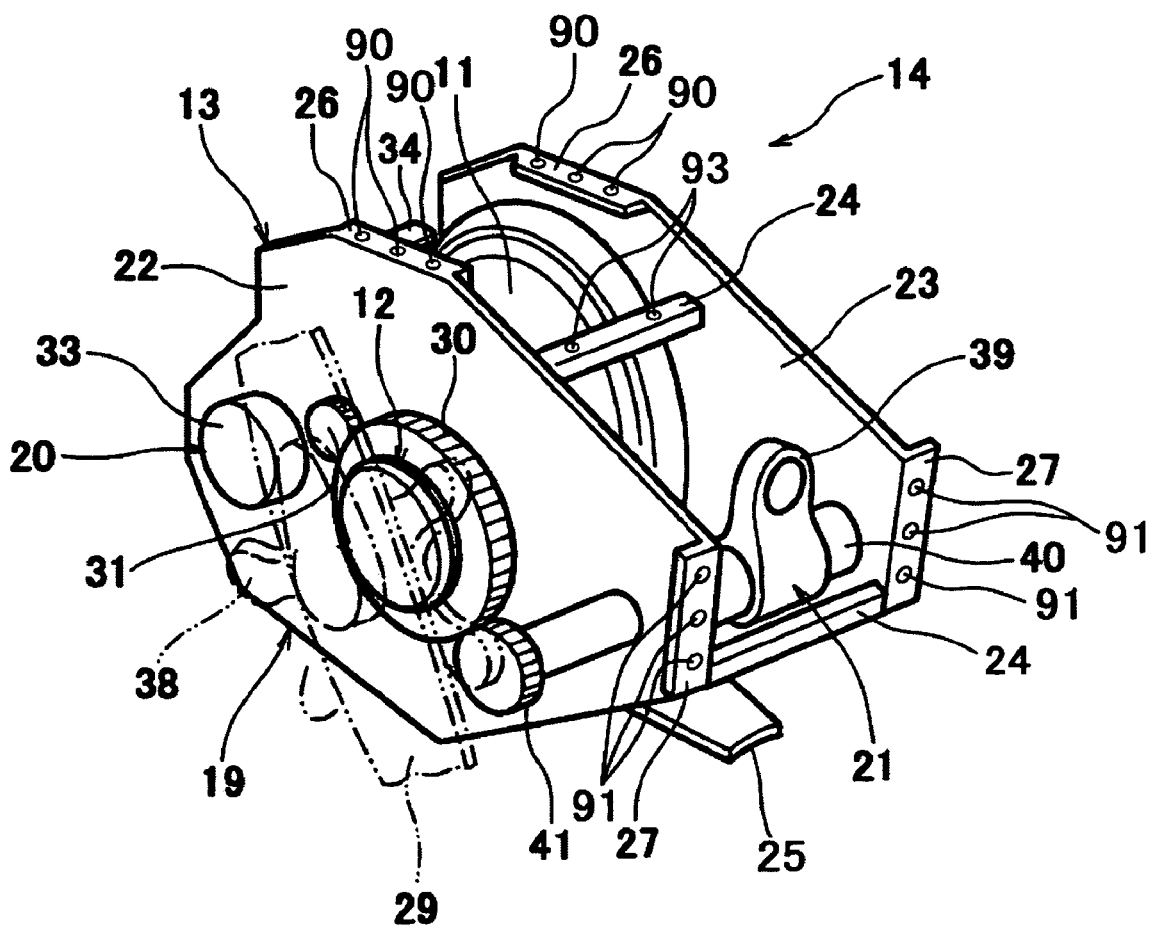
FIG. 2 is a perspective view showing the structure of the basic unit of the dual bearing reel in accordance with the first embodiment of the present invention.

FIG. 2 is a perspective view showing the structure of the aforementioned basic unit 14.

Referring to FIGS. 1 and 2, the dual bearing reel 10 has the basic unit 14, and the first through fourth outer plate members 15–18.

As described above, the basic unit 14 has all the indispensable functions of the dual bearing reel 10. In other words, the basic unit 14 is capable of performing functions such as winding and reeling out the fishing line by itself The basic unit 14 includes the attachment frame 13, the spool 11, a spool driving mechanism 19 that drives the spool 11, a braking mechanism 20 that applies a brake to the rotation of the spool 11, and a level winding mechanism 21. The functional members such as the spool 11 are positioned at predetermined positions of the attachment frame 13, such that the functional members can function in cooperation with each other. The aforementioned spool driving mechanism 19 includes a drag mechanism 12. The drag mechanism 12 restricts reeling out of the fishing line and prevents a breakage of the fishing line by rotating the spool 11 in the reverse direction when a tension that is greater than a predetermined level is applied to the fishing line.

The attachment frame 13 can be made of a metal or a synthetic resin. The attachment frame 13 forms a skeleton of the dual bearing reel 10. Referring to FIG. 2, the attachment frame 13 includes a pair of side portions 22 and 23, which are disposed opposite from each other, a plurality of cross members 24, which is bridged over the side portions 22 and 23, and a leg portion 25, which is formed continuously with the cross members 24.

The cross members 24 increase the rigidity of the attachment frame 13. The cross members 24 also function as a seat for attaching the outer plate member 15. In FIG. 2, only two of the cross members 24 are shown. However, the cross members can be formed on other positions as necessary.

A bracket 26 is formed on the side portion 22 as a one-piece unitary member. The bracket 26 is for attaching the outer plate member 16 thereon. A bracket 27 is formed on the front portion of the side portion 22 as a one-piece unitary member. The bracket 27 is for attaching the outer plate member 15 thereto. These brackets 26 and 27 respectively have engagement bores 90 and 91 for attaching the outer plate members. One of the cross members 24 also has engagement bores 93 for attaching the outer plate member 15. The side portion 22 has a plurality of insertion bores (not shown in Figures) for supporting members such as a main shaft 28 (to be described later) of the spool driving mechanism 19. A bearing is attached to an insertion bore that, for example, supports a rotational shaft 32 of the spool 11. The side portion 23 is formed symmetrically with the side portion 22. The side portion 23 also has the brackets 26 and 27 formed thereon.

The attachment frame 13 can be formed as a one-piece unitary member. Alternatively, the cross members 24 can be formed as separate members that are attachable to the side portions 22 and 23.

The spool 11, the spool driving mechanism 19, the braking mechanism 20, the drag mechanism 12, and the level winding mechanism 21 have structures that are similar to those of the conventional ones. Accordingly, only brief descriptions and explanations of how these components are assembled will be given with regard to these components.

Figure 3:
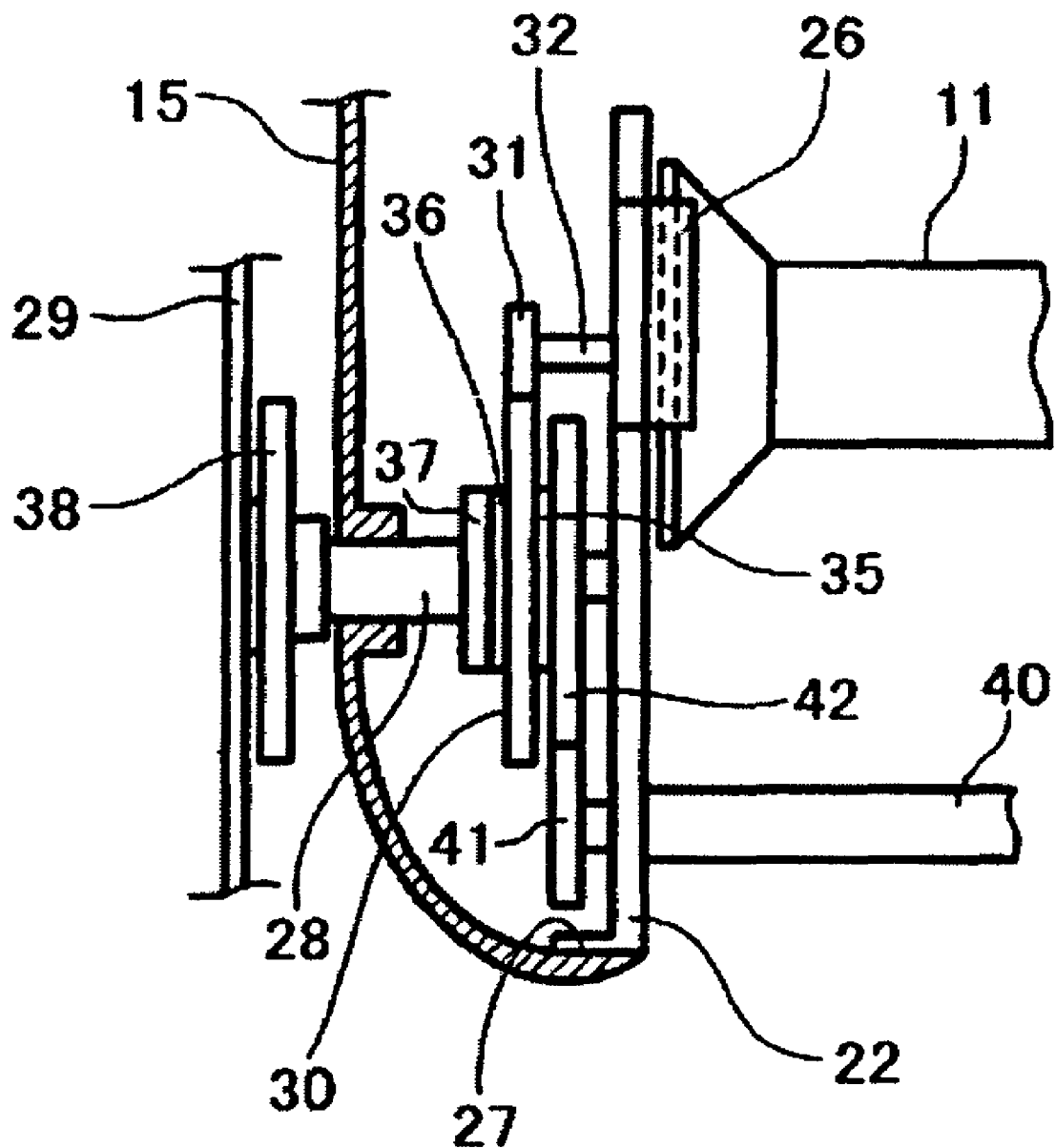
FIG. 3 is a cross-sectional view of a portion of the spool driving mechanism as viewed in the direction of arrow A—A in FIG. 1.

FIG. 3 is a cross-sectional view of a portion of the spool driving mechanism 19 viewed in the direction of arrow A—A in FIG. 1.

Referring to FIGS. 2 and 3, the spool 11 is a member for winding the fishing line. The spool 11 can rotate in the normal or reverse direction. The normal rotation winds the fishing line, while the reverse rotation reels out the fishing line from the spool 11.

The spool driving mechanism 19 includes the handle 29, the main shaft 28 coupled to the handle 29, a main gear 30 formed on the main shaft 28, a spool gear 31 that engages the main gear 30, a clutch mechanism (not shown in Figures), and the above-described drag mechanism 12. In FIG. 2, the referential numeral 34 indicates a clutch lever. When the clutch mechanism is in an inactive state, the spool 11 is allowed to rotate freely. When the clutch mechanism is in an active state, the spool 11 is allowed to rotate in the normal direction. But the clutch mechanism, in cooperation with the drag mechanism 12 as described above, allows the reverse rotation of the spool 11 only under certain circumstances.

Therefore, once the clutch mechanism is turned into the active state, the fishing line can be wound on the spool 11 as the spool driving mechanism 19 rotates the spool 11 in the normal direction. At this time, if a tension is applied to the fishing line, the drag mechanism 12 restricts the rotation of the spool 11 in the reverse direction. If the tension that is applied to the fishing line is greater than a predetermined level, the spool 11 rotates in the reverse direction to prevent breakage of the fishing line. On the other hand, when the clutch mechanism is in the inactive state, the spool 11 can rotate freely in both normal and reverse directions. In this manner, casting of the bait can be performed.

The spool gear 31 is attached to the rotational shaft 32 of the spool 11. Therefore, when the handle 29 is rotated, the main shaft 28 is rotated. Accordingly, the rotational shaft 32 of the spool 11 is rotated via the main gear 30 and the spool gear 31. Thus, the spool 11 is rotated.

The braking mechanism 20 restricts the rotation of the spool 11. More specifically, the braking mechanism 20 applies a brake on the rotation of the rotational shaft 32 of the spool 11. The braking mechanism 20 is a mechanism for preventing a backlash of the fishing line at the time of casting. In this embodiment, a so-called mechanical brake is used as the braking mechanism 20. However, other type of brake mechanisms such as magnet type braking mechanism can be utilized instead of or in conjunction with the mechanical braking mechanism. In FIG. 2, the referential numeral 33 indicates a thumbscrew for adjusting the braking force to be applied to the spool 11.

The drag mechanism 12 restrictively allows the reverse rotation of the spool 11 when the aforementioned clutch mechanism is in the active state. In other words, the drag mechanism 12 allows the reverse rotation of the spool 11 when a tension that is greater than a predetermined level is applied to the fishing line. In this manner, the fishing line is reeled out of the spool 11 by rotating the spool 11 in the reverse direction to prevent the breakage of the fishing line due to, for instance, "pull" by the fish during the fighting.

Referring to FIG. 3, the drag mechanism 12 includes a pair of drag washers 35 and 36 that is disposed between the main gear 30 and the main shaft 28, a drag plate 37, a drag handle 38, and a pressure member (not shown in Figures) that is disposed between the drag handle 38 and the drag plate 37. By rotating the drag handle 38, a pressure is applied to the pressure member. Accordingly, a pressure is also applied to the drag plate 37. As a result, the pair of drag washers 35 and 36 sandwiches the main gear 30, thereby generating a predetermined resistance between the main gear 30 and the main shaft 28 (which corresponds to the predetermined tension applied to the fishing line).

Therefore, even while the clutch mechanism is in the active state, once a tension that is greater than the predetermined level is applied to the fishing line, a rotational force in the reverse direction is applied to the spool 11. At this time, a slip occurs between the main gear 30 and the main shaft 28, such that only the spool 11 rotates in the reverse direction.

The level winding mechanism 21 aligns the fishing line uniformly on the spool 11 when the fishing line is wound by rotating the spool 11. The level winding mechanism 21 includes a level winder 39 through which the fishing line passes, a slide shaft 40 that supports the level winder 39, a driving gear 41 that is installed on the slide shaft 40, and an intermediate gear 42 that engages the driving gear 41 and is installed on the main shaft 28.

When the main gear 28 is rotated, the spool 11 is also rotated, thereby winding the fishing line. At the same time, the slide shaft 40 is rotated via the intermediate gear 42 and the driving gear 41. The slide shaft 40 has helical grooves formed thereon in the axial direction. The level winder 39 engages these grooves. Therefore, as the slide shaft 40 rotates, the level winder 39 shifts front and rear along the slide shaft 40. As a result, the fishing line is wound and aligned uniformly on the spool 11.

Next, each of the outer plate members 15–18 will be explained.

Figure 4:
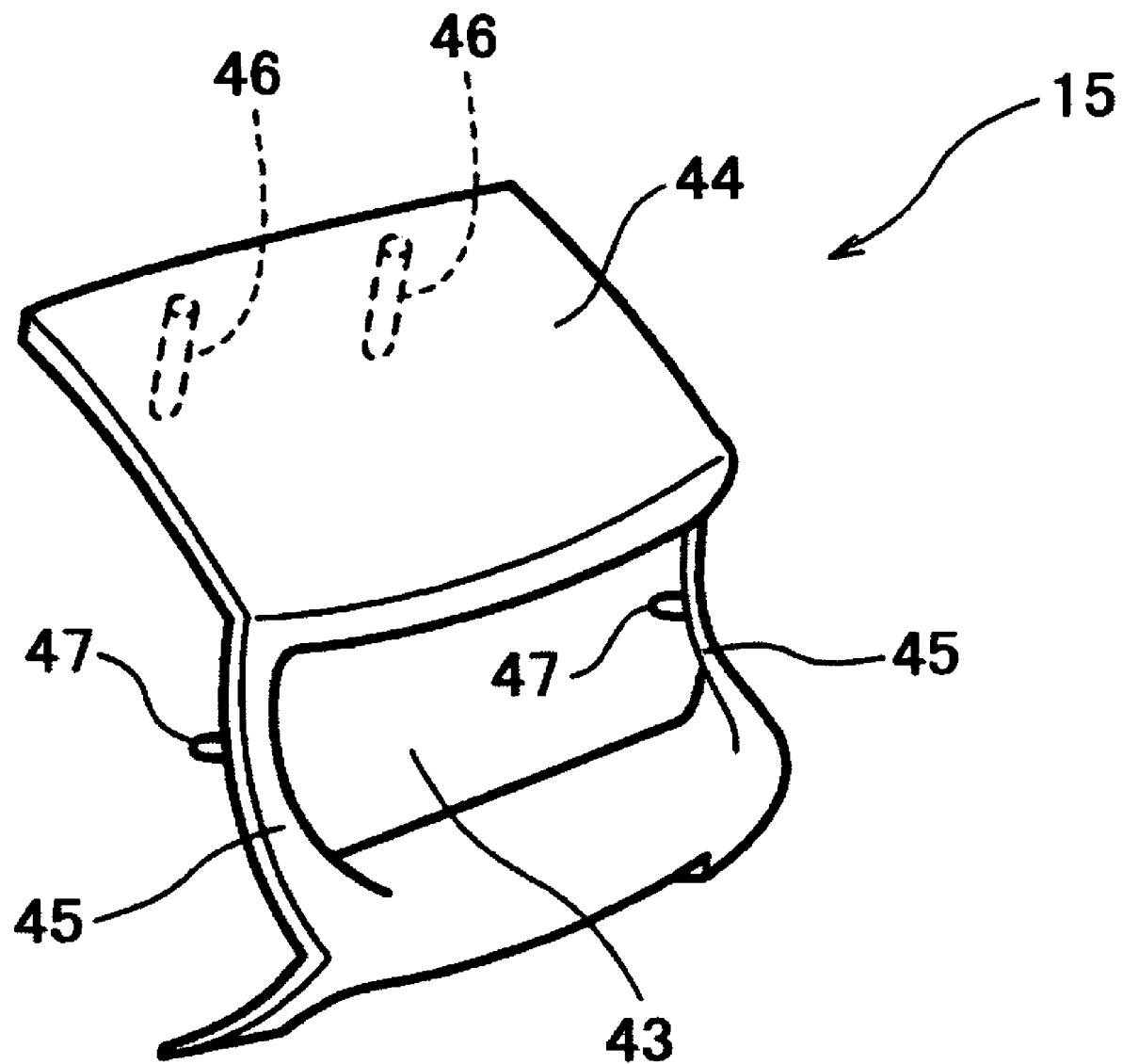
FIG. 4 is a perspective view of the first outer plate member in accordance with the first embodiment of the present invention.

FIG. 4 is a perspective view of the first outer plate member 15.

Referring to FIGS. 1 and 4, the first outer plate member 15 can be made of a synthetic resin as a one-piece unitary member. The first outer plate member 15 functions as the frontal surface of the dual bearing reel 10. The first outer plate member 15 has a fishing line passing window 43 to allow the fishing line to pass therethrough. Engaging pins 46 and 47 (an example of first engagement portion) are formed projecting from a ceiling portion 44 and pillar portions 45 (body portion) of the first outer plate member 15. The engaging pins 46 engage the engagement bores 93 formed on the cross member 24 (see FIG. 2) of the attachment frame 13. Similarly, the engaging pins 47 engage the engagement bores 91 formed on the brackets 27 (see FIG. 2) of the attachment frame 13. In this manner, the first outer plate member 15 is attached to the attachment frame 13, without engaging the spool 11 or the spool driving mechanism 19.

Figure 5:
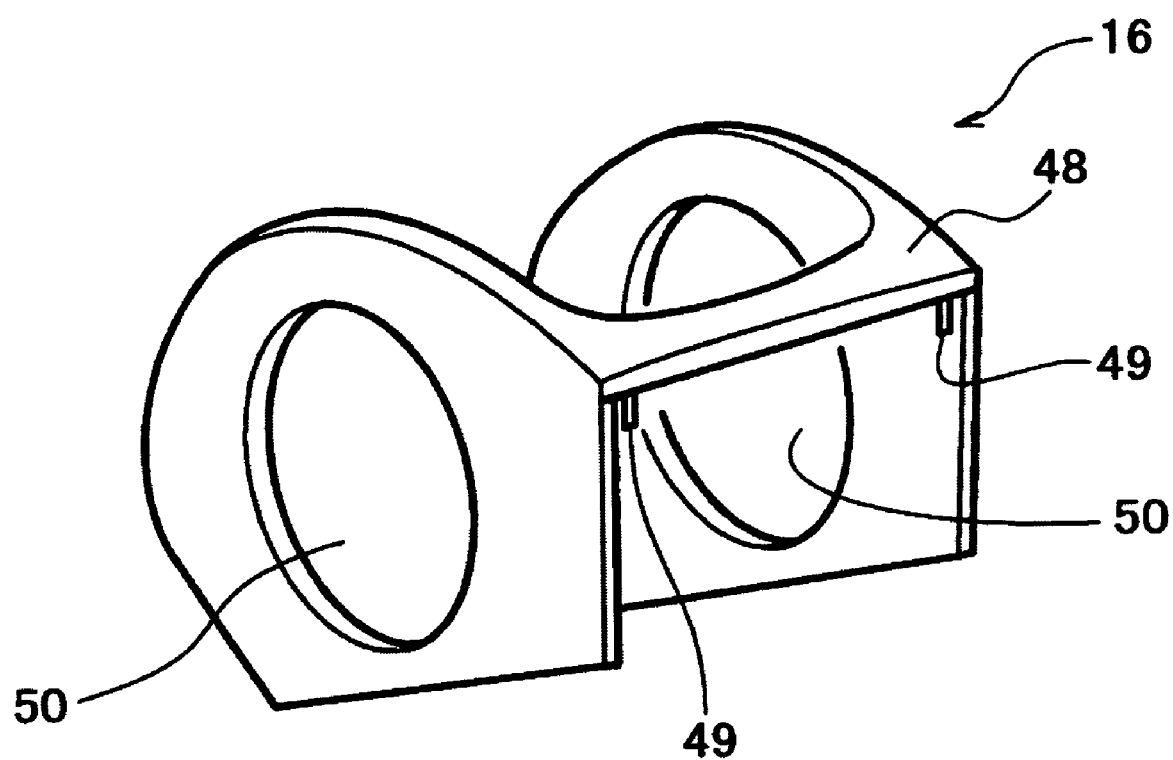
FIG. 5 is a perspective view of the second outer plate member in accordance with the first embodiment of the present invention.

Referring to FIGS. 1 and 5, the second outer plate member 16 can be made of a synthetic resin as a one-piece unitary member. The second outer plate member 16 functions as an upper surface of the dual bearing reel 10. Engaging pins 49 are formed projecting from a top plate 48 of the second outer plate member 16. The engaging pins 49 engage the engagement bores 90 of the brackets 26 (see FIG. 2) of the attachment frame 13. The referential numerals 50 are openings to accommodate the spool 11 therein. In this manner, the second outer plate member 16 is attached to the attachment frame 13, without engaging the spool 11 or the spool driving mechanism 19.

Figure 6:
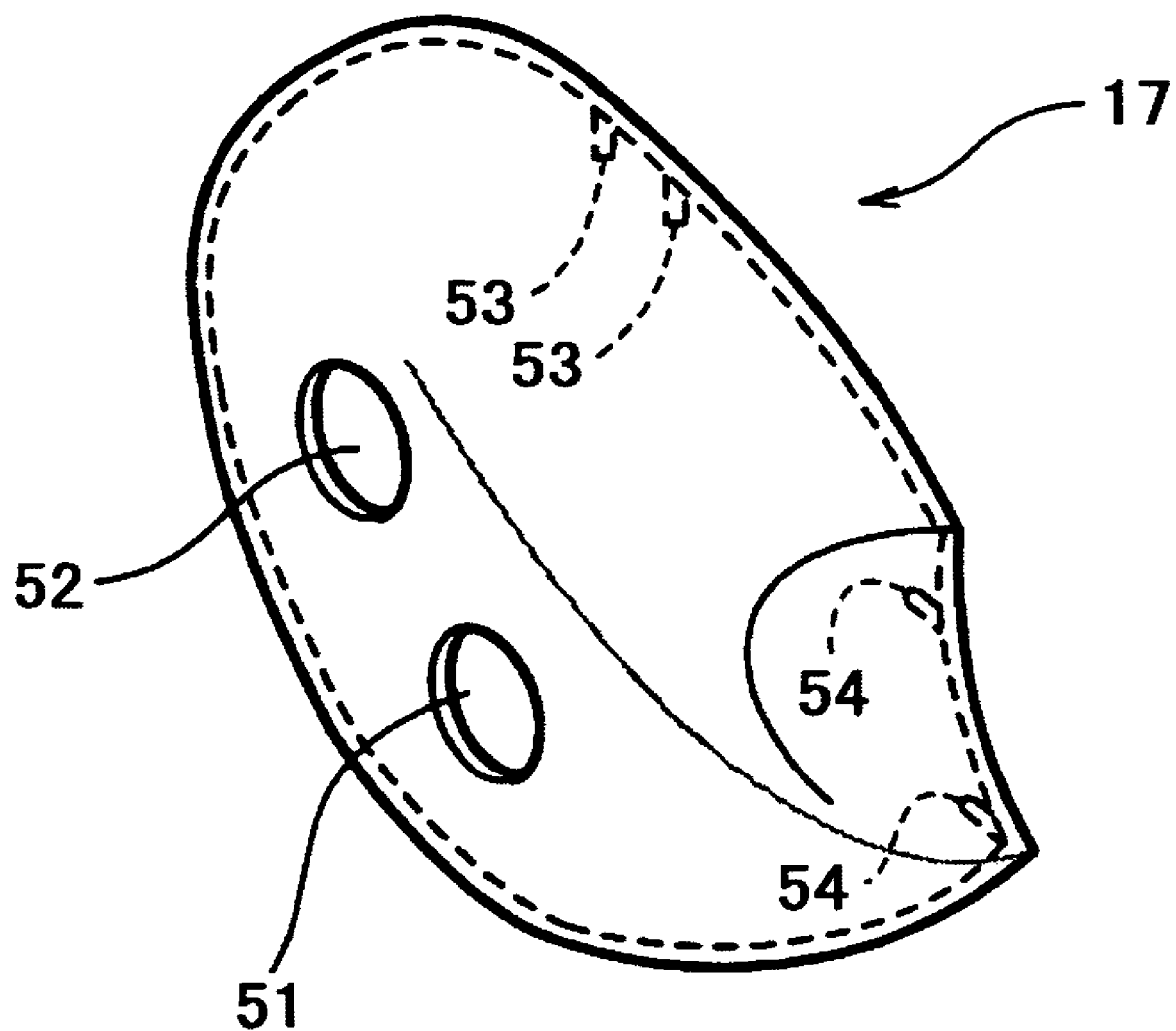
FIG. 6 is a perspective view of the third outer plate member in accordance with the first embodiment of the present invention.

Referring to FIGS. 1 and 6, the third outer plate member 17 can be made of a synthetic resin as a one-piece unitary member. In this embodiment, as seen in Figures, the third plate member 17 has an egg-like shape. The third outer plate member 17 is shaped like a container with its inner portion taken away. The third outer plate member 17 forms the right side surface of the dual bearing reel 10. Engaging pins 53 and 54 are formed projecting from the main body of the third outer plate member 17. The engaging pins 53 engage the engagement bores 90 of the bracket 26 of the attachment frame 13, while the engaging pins 54 engage the engagement bores 91 of the bracket 27. The brackets 26 and 27 have engagement bores 90 and 91, which the engaging pins 53 and 54 engage. In this manner, the third outer plate member 17 is attached to the attachment frame 13, without engaging the spool 11 or the spool driving mechanism 19.

The third outer plate member 17 includes a main shaft insertion opening 51 and a brake thumbscrew insertion opening 52. The main shaft insertion opening 51 can receive the main shaft 28 of the spool driving mechanism 19 (see FIG. 3) inserted therethrough. As shown in FIG. 1, the handle 29 can be disposed outside the third outer plate 17. The brake thumbscrew insertion opening 52 can receive a thumbscrew 33 of the braking mechanism 20 inserted therethrough. As shown in FIG. 1, the thumbscrew 33 can be disposed outside the third outer plate member 17.

Figure 7:
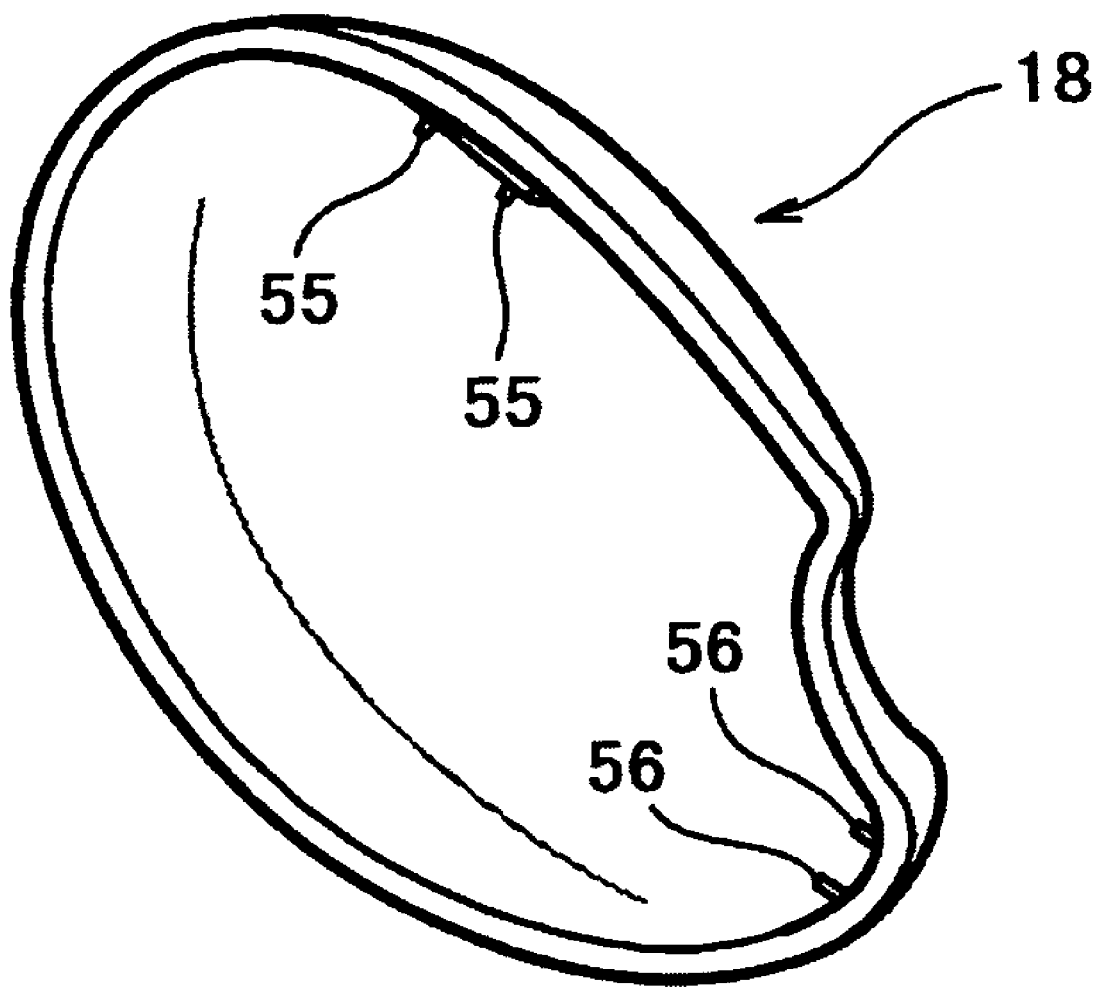
FIG. 7 is a perspective view of the fourth outer plate member in accordance with the first embodiment of the present invention.

Referring to FIGS. 1 and 7, the fourth outer plate member 18 can be made of a synthetic resin as a one-piece unitary member. In this embodiment, the fourth outer plate member 18 is formed symmetrically with the third outer plate member 17. However, while the third outer plate member 17 has the main shaft insertion opening 51 and the brake thumbscrew insertion opening 52, the fourth outer plate member 18 does not have such openings. This is because the handle 29 and the thumbscrew 33 are not disposed on the left side of the dual bearing reel 10. Where the handle 29 and other members are disposed on the left side, however, the fourth outer plate member 18, like the third outer plate member 17, can have openings for inserting the main shaft 28 therethrough. The fourth outer plate member 18 forms the left side surface of the dual bearing reel 10.

Engaging pins 55 and 56 are formed projecting from the fourth outer plate member 18. The engaging pins 55 engage the engagement bores 90 of the bracket 26 of the attachment frame 13, while the engaging pins 56 engage the engagement bores 91 of the bracket 27. The brackets 26 and 27 have engagement bores 90 and 91, which the engaging pins 55 and 56 engage. In this manner, the fourth outer plate member 18 is attached to the attachment frame 13, without engaging the spool 11 or the spool driving mechanism 19.

According to this embodiment, the functional members such as the spool 11, the spool driving mechanism 19, the braking mechanism 20, and the level winding mechanism 21 are installed in the attachment frame 13, such that the functional members function in cooperation with each other. Accordingly, the attachment frame 13 and the aforementioned functional members that are installed in the attachment frame 13 form the basic unit 14, which by itself has indispensable functions of the dual bearing reel 10. The surfaces of the dual bearing reel 10 are formed by attaching each of the outer plate members 15–18 to the attachment frame 13. In this manner, the complete dual bearing reel 10 is created.

The manner of assembling the dual bearing reel 10 will now be explained. First of all, the spool 11 is attached to the attachment frame 13. Then, the braking mechanism 20 is attached. Then, the level winding mechanism 21 and the spool driving mechanism 19 are installed. Thereafter, each of the outer plate members 15–18 is attached. However, the handle 29 of the spool driving mechanism 19 and the drag handle 38 of the drag mechanism 12 are installed after all of the outer plate members 15–18 are attached. The braking mechanism 20, the spool driving mechanism 19, and the level winding mechanism 21 are detachably attached to the attachment frame 13 to allow easy maintenance of the dual bearing reel 10.

Since the surfaces of the dual bearing reel 10 are formed solely by the outer plate members 15–18 in the aforementioned manner, the outer plate members 15–18 do not need to function as a support for the spool 11 or a support for the drag mechanism 12. Accordingly, there is no design restriction due to the functional requirements as in the case of conventional dual bearing reels. As a result, the appearance of the dual bearing reel 10 can be freely designed. Furthermore, by establishing the outer plate members only as an option product, it is possible to provide a variety of dual bearing reels with the ornamental designs of users' preference.

By making each of the outer plate members 15–18 from an ABS resin, it is possible to apply coating or plating more easily. In this manner, it is possible to manufacture outer plate members with a more variety of ornamental designs at a low cost.

In the above embodiment, the outer plate members 15–18 are shown as an example. Accordingly, the shapes of the outer plate members are not limited to the ones disclosed in the embodiment; the outer plate members can have any desired shape.

Furthermore, in the above embodiment, the outer plate members 15–18 are attached to the attachment frame 13 through engagement (coupling) via the engaging pins. Since each of the outer plate members 15–18 only functions as a surface of the dual bearing reel 10, the requirements for precision and solidness of attachment (tightness of assembly and rigidity against twisting and bending) are not as great as in the case of conventional dual bearing reels. By adopting such coupling structure, the outer plate members 15–18 can be attached to the attachment frame 13 very easily. Accordingly, the cost of assembling the dual bearing reel 10 can be reduced.

However, the manner of attaching the outer plate members 15–18 is not limited to the coupling structure. The outer plate members 15–18 can be attached by any other known engagement structure such as coupling the outer plate members 15–18 directly to the attachment frame 13.

Second and Third Embodiments

Figure 8:
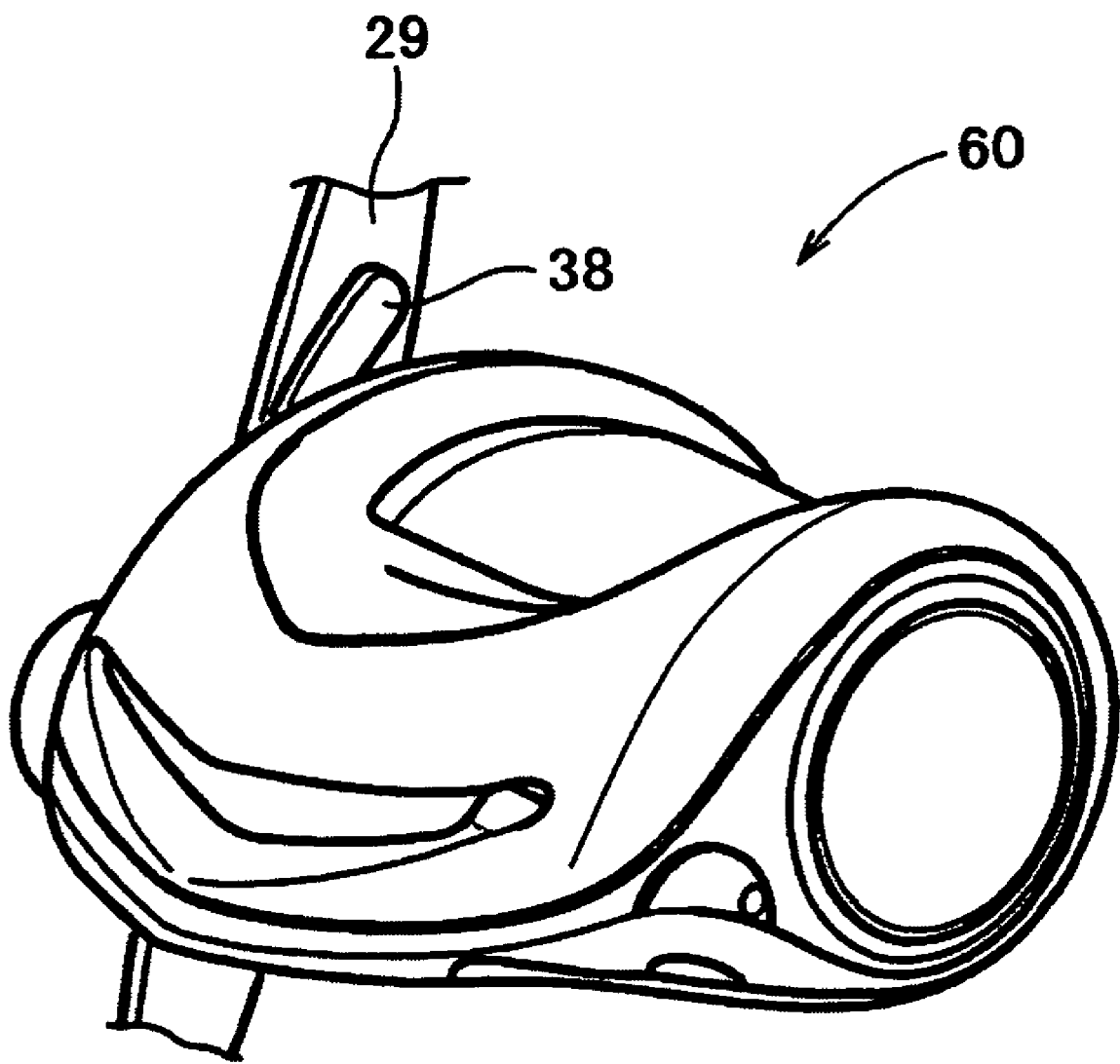
FIG. 8 is a perspective view of the dual bearing reel in accordance with the second embodiment of the present invention.
Figure 10:
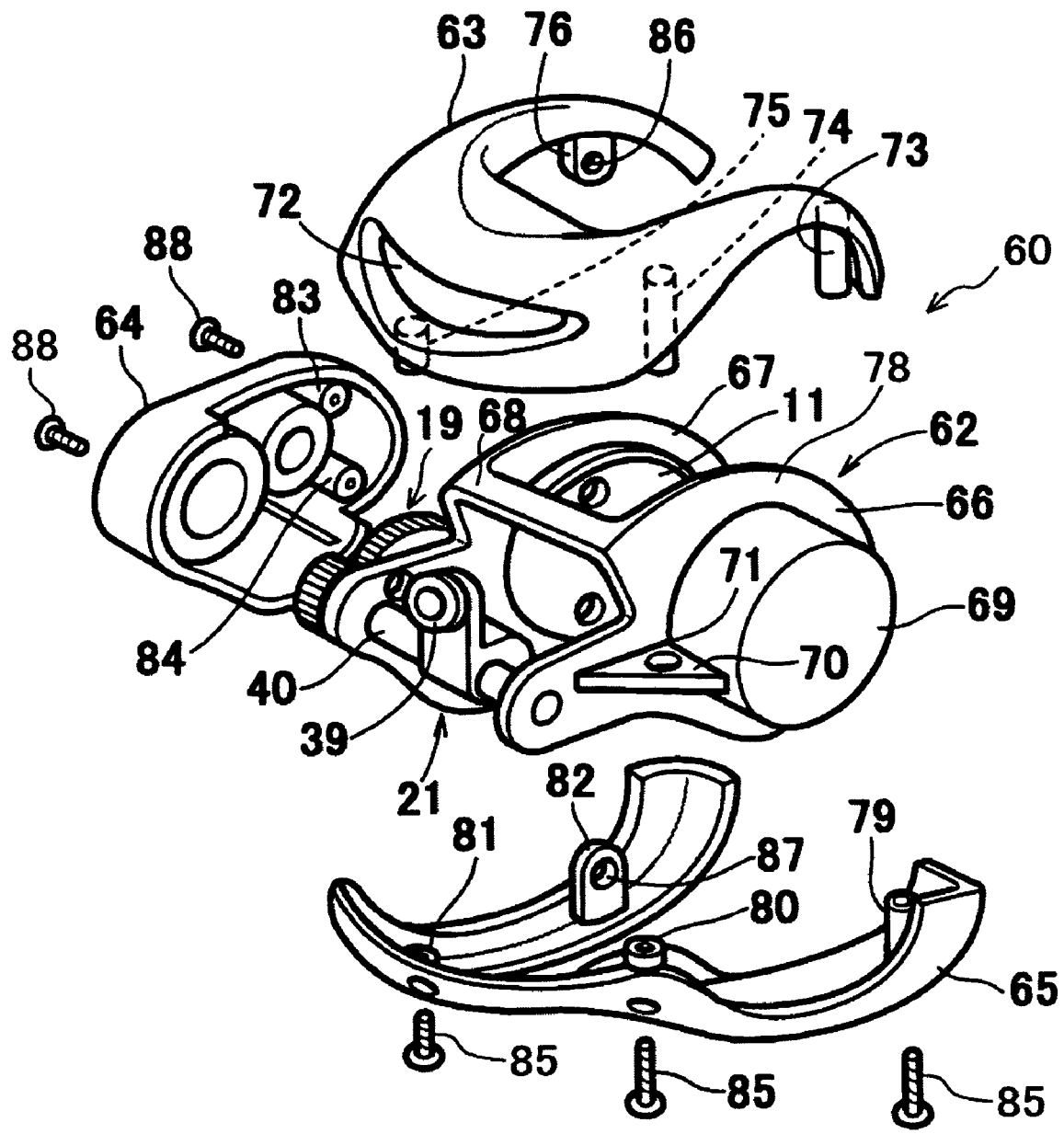
FIG. 10 is an exploded perspective view of the dual bearing reel in accordance with the second embodiment of the present invention.
Figure 11:
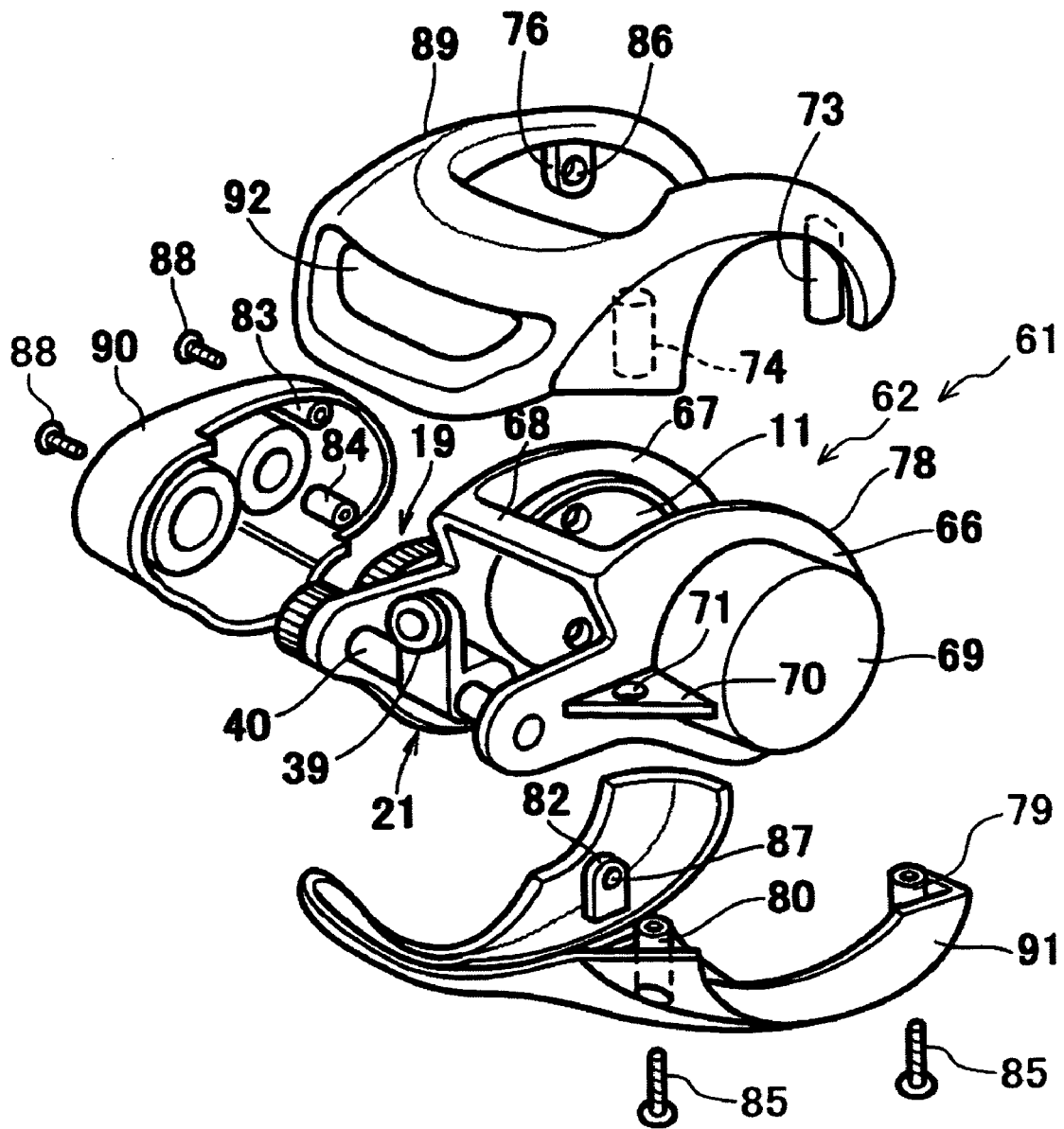
FIG. 11 is an exploded perspective view of the dual bearing reel in accordance with the third embodiment of the present invention.

Next, second and third embodiments of the present invention will be described with reference to FIGS. 8–11. FIGS. 8 and 10 show the dual bearing reel 60 of the second embodiment, while FIGS. 9 and 11 show the dual bearing reel 61 of the third embodiment.

Figure 9:
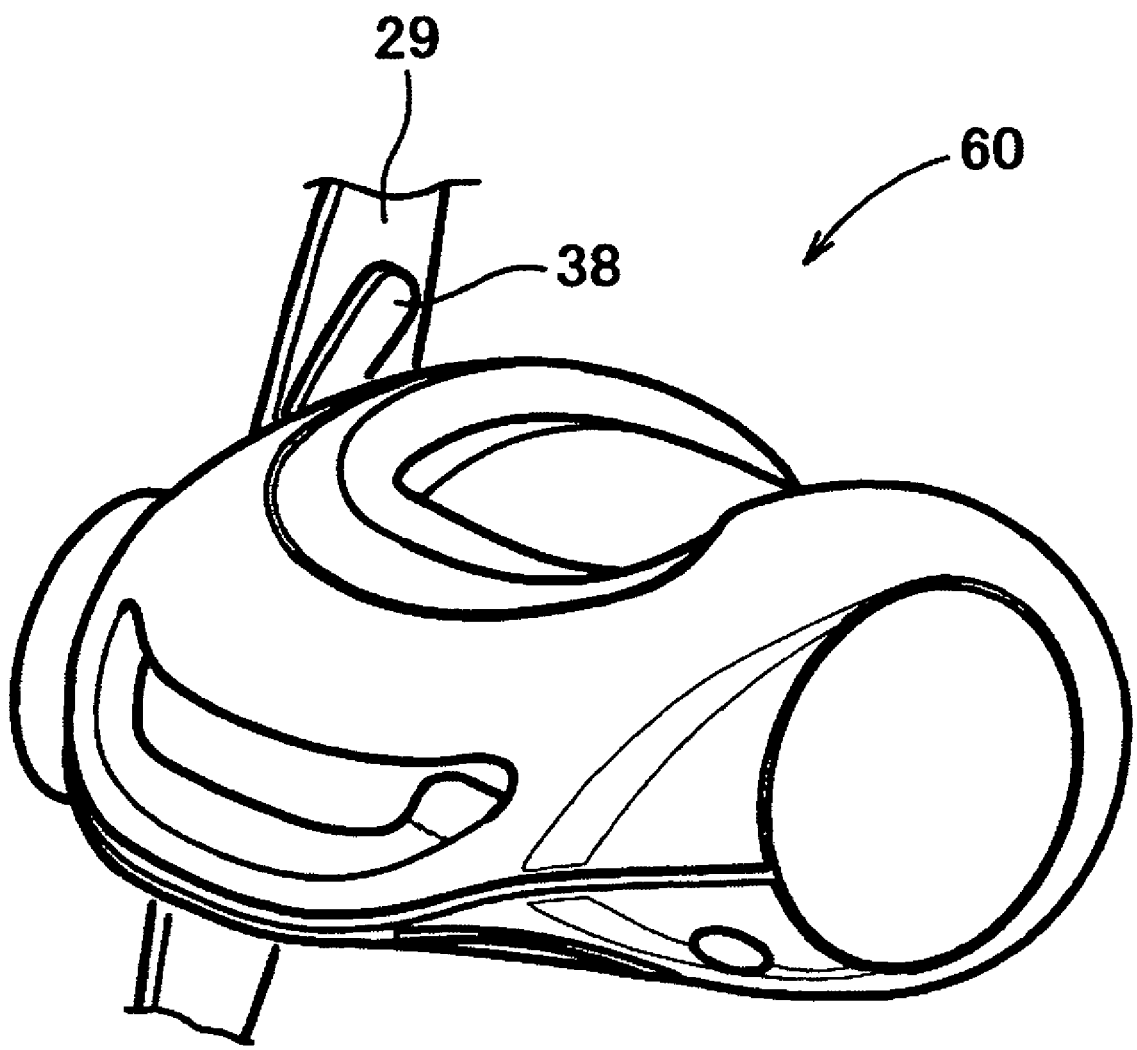
FIG. 9 is a perspective view of the dual bearing reel in accordance with the third embodiment of the present invention.

FIGS. 8 and 9 are perspective views of dual bearing reels 60 and 61 in accordance with the second and third embodiments of the present invention, respectively.

In this embodiment, as in the above-discussed first embodiment, each of the dual bearing reels 60 and 61 has a basic unit and outer plate members attached to the basic unit. The basic unit and the outer plate members will be described later. In other words, these dual bearing reels 60 and 61 have a common basic unit 62, which has all indispensable functions of dual bearing reels 60 and 61. Therefore, the dual bearing reels 60 and 61 are the same in terms of functionality, yet their appearances are different. In the descriptions below, components that are the same as in the above-described dual bearing reel 10 will be given the same referential numerals. Also, explanation of those components will be omitted.

Second Embodiment

FIG. 10 is an exploded perspective view of the dual bearing reel 60 in accordance with the second embodiment of the present invention.

Referring to FIG. 10, the dual bearing reel 60 includes a basic unit 62 and outer plate members 63–65 (example of first through third outer plate members).

As in the above-described first embodiment, the basic unit 62 includes all the indispensable functions of the dual bearing reel 60. In other words, the basic unit 62 is capable of performing functions such as winding and reeling out the fishing line by itself. The basic unit 62 includes an attachment frame 78, the spool 11, the spool driving mechanism 19 that drives the spool 11, the braking mechanism 20 (not shown in Figures) that brakes rotation of the spool 11, and the level winding mechanism 21. These functional members such as the spool 11 are positioned at predetermined positions in the attachment frame 78. Each of these functional members is installed in the attachment frame 78 such that they can function in cooperation with each other.

The attachment frame 78 can be made of a metal or a synthetic resin. The attachment frame 78 forms the skeleton of the dual bearing reel 60. The attachment frame 78 includes a pair of side portions 66 and 67 that are disposed opposite each other, a cross member 68 that bridges the side portions 66 and 67, and a leg portion (same structure as in the first embodiment) that is not shown in Figures but is formed continuously with the attachment frame 78. Although only one cross member 68 is shown in FIG. 10, there can be a plurality of cross members 68 to secure the requisite rigidity of the attachment frame 78.

The side portion 66 has a cylindrical portion 69 formed thereon as shown in FIG. 10. A rib 70 is formed in between the cylindrical portion 69 and the front end portion of the side portion 66. The rib 70 has an engagement bore 71 (an example of second engagement portion) formed thereon. The engagement bore 71 is for fixedly coupling a fixing boss 80 (an example of first engagement portion) of the outer plate member 65 thereto.

The side portion 67 has a plurality of insertion bores (not shown in Figures) for supporting members such as the main axis of the spool driving mechanism 19. A requisite bearing is attached to an insertion bore that, for example, supports a rotational shaft of the spool 11.

In this embodiment, the attachment frame 78 is formed as a one-piece unitary member. Alternatively, the cross member 68 can be formed as a separate member that is attachable to the side portions 66 and 67.

The spool 11, the spool driving mechanism 19 that includes the drag mechanism 12, the braking mechanism 20, and the level winding mechanism 21 are the same as the conventional ones. Since these components have been described in the first embodiment, the explanation of these components will be omitted.

The outer plate member 63 can be made of, for example, a synthetic resin (preferably ABS resin) as a one-piece unitary member. The outer plate member 63 functions as the surface of the dual bearing reel 60 covering the front portion, the top portion, and both of the side portions. The first outer plate member 63 has a fishing line passing window 72 to allow the fishing line to pass therethrough. As shown in FIG. 10, the outer plate member 63 is formed in the shape of sun glasses. The outer plate member 63 includes fixing bosses 73, 74, and 75 (example of third engagement portion), and a fixing bracket 76.

The fixing bosses 73, 74, and 75 are respectively opposed to and threadedly coupled to fixing bosses 79, 80, and 81 (example of fourth engagement portion) of the outer plate member 65 which will be described later to engage said outer plate members 63 and 65. The fixing bracket 76, along with a fixing bracket 82 of the outer plate member 65 which will be described later, is fixedly coupled to the side portion 67 of the attachment frame 78 via the outer plate member 64.

The outer plate member 64 can be made of, for example, a synthetic resin (preferably ABS resin) as a one-piece unitary member. The outer plate 64 functions as the surface covering a portion of the right side portion of the dual bearing reel 60. The outer plate 64 has fixing bosses 83 and 84 formed thereon, such that the fixing bosses 83 and 84 can be threadedly coupled to the side portion 67 of the attachment frame 78.

The outer plate member 65 can be made of, for example, a synthetic resin (preferably ABS resin) as a one-piece unitary member. The outer plate member 65 functions as the surface covering both of the side portions and a portion of the bottom portion of the dual bearing reel 60. The outer plate member 65 has the fixing bosses 79, 80, and 81, and the fixing bracket 82 formed thereon.

This dual bearing reel 60 is assembled in the following manner.

First of all, the outer plate member 65 is attached to the attachment frame 78 from below. At this time, the fixing boss 80 is inserted through the engagement bore 71 formed on the rib 70 of the attachment frame 78. In this manner, the position of the outer plate member 65 is determined relative to the attachment frame 78. Then, the outer plate members 63 and 64 are attached to the attachment frame 78 from above and from the side, respectively. At this time, the fixing bosses 79–81 are opposed to the fixing bosses 73–75 respectively. Screws 85 are screwed into the outer plate member 65 from below to position the outer plate members 63 and 65 relative to the attachment frame 78.

Where the outer plate members 63 and 65 are positioned as described above, the fixing brackets 76 and 82 are disposed along the right side portion of the attachment frame 78. By disposing the outer plate member 64 on the right side portion of the attachment frame 78, the fixing bosses 83 and 84 are opposed to the fixing brackets 76 and 82. Then, by screwing screws 88 (example of engagement member) into the fixing bosses 83 and 84 and the fixing brackets 78 and 82, the outer plate member 64 is coupled to the outer plate members 63 and 65. As a result, each or the outer plate members 63–65 is positioned and fixedly coupled to the attachment frame 78. The fixing brackets 76 and 82 have threaded bores 86 and 87, to allow the screws 88 to be inserted therethrough.

Third Embodiment

FIG. 11 is an exploded perspective view of the dual bearing reel 61 in accordance with the third embodiment of the present invention.

Referring to FIG. 11, the dual bearing reel 61 includes the basic unit 62 of the dual bearing reel 60 as described above, and the outer plate members 89–91. The only difference between the structure of the dual bearing reel 61 and that of the dual bearing reel 60 is the outer shapes of the outer plate members 89–91.

In other words, in comparing the outer plate members 63–65 of the dual bearing reel 60 and the outer plate members 89–91 of the dual bearing reel 61, the outer plate member 89 corresponds to the outer plate member 63 of the dual bearing reel 60, the outer plate member 90 corresponds to the outer plate member 64 of the dual bearing reel 60, and the outer plate member 91 corresponds to the outer plate member 65 of the dual bearing reel 60.

The dual bearing reel 60 differs from the dual bearing reel 61 in its outer shape and the shape of the line insertion window 92. The dual bearing reel 61 also does not have the fixing bosses 75 and 81. The shapes and positions of the fixing bosses 73–74 and the fixing bracket 76 of the outer plate member 89 are the same as those of the outer plate member 63 (see FIG. 10). Similarly, the outer plate members 90 and 91 differ from the outer plate members 64 and 65 only in their outer shapes, except that the outer plate member 91 does not have the fixing boss 81.

According to the present embodiment, the functional members such as the spool 11, the spool driving mechanism 19, the braking mechanism 20, and the level winding mechanism 21 are attached to the attachment frame 78 such that the functional members function in cooperation with each other. Accordingly, the basic unit 62 by itself has all the indispensable functions of the dual bearing reels 60 and 61. By attaching each of the outer plate members 63–65 or 89–91 to the attachment frame 78, the surfaces of the dual bearing reel 60 or 61 are completely formed. In this manner, the complete dual bearing reel 60 or 61 is created.

Since the surfaces of the dual bearing reels 60 and 61 are formed solely by the outer plate members 63–65 or 89–91 in this embodiment, the outer plate members 63–65 and 89–91 do not need to function as a support for the spool 11 or a support for the drag mechanism 12. Accordingly, there is no design restriction due to functional requirements as in the case of conventional dual bearing reels. As a result, the appearance of the dual bearing reel 60 or 61 can be freely designed. Furthermore, by establishing the outer plate members only as an option product, it is possible to change the ornamental design of the dual bearing reel 60 to that of the dual bearing reel 61 easily. Accordingly, it is possible to provide a variety of dual bearing reels with ornamental designs of users' preference.

Furthermore, in the above embodiment, the outer plate members 63–65 and 89–91 are attached to the attachment frame 78 through a fastening structure utilizing the screws 85 and 88. Since each of the outer plate members 63–65 and 89–91 only functions as a surface of the dual bearing reels 60 and 61 as in the first embodiment, the requirements for precision and solidness of attachment (tightness of assembly and rigidity against twisting and bending) are not as great as in the case of conventional dual bearing reels. By adopting such fastening structure, the outer plate members 63–65 and 89–91 can be attached to the attachment frame 78 very easily. Accordingly, the cost of assembling the dual bearing reel 60 or 61 can be reduced.

By making each of the outer plate members 63–65 and 89–91 from an ABS resin, it is possible to apply coating or plating more easily as in the first embodiment. In this manner, it is possible to manufacture outer plate members with a still greater variety of ornamental designs at a low cost.

In the above-described embodiments, the dual bearing reel 10, 60, or 61 has the braking mechanism 20 and the level winding mechanism 21 as its functional members. However, these functional members can be omitted. In other words, since the braking mechanism 20 and the level winding mechanism 21 are detachably attached to the attachment frame 13 or 78 as described above, the basic unit 14 or 62 can be formed with the braking mechanism 20 and the level winding mechanism 21 being detached. In this manner, the braking mechanism 20 and the level winding mechanism 21 can be provided as an option product of the dual bearing reel 10, 60, or 61. Thus, it is possible to provide a dual bearing reel with a specification of user's request.

As described above, according to the present invention, the dual bearing reel includes a unit that has all the indispensable functions of the dual bearing reel, and outer plate members that are attached to the unit. Therefore, the surfaces of the dual bearing reel can be designed freely without having to take into consideration the shapes of the functional components.

Therefore, the flexibility of design of the dual bearing reel increases overall. Accordingly, it is possible to provide low-priced and high-quality dual bearing reels. Furthermore, since the outer plate members function merely as decorative plates, it is possible to provide a variety of outer plate members as option products. In this manner, it is possible to perform design change easily and cheaply to meet users' preference. In addition, it is possible to establish common products that can be utilized in various models. Accordingly, it is possible to reduce the cost of parts of dual bearing reels.

Fourth Embodiment

Figure 12:
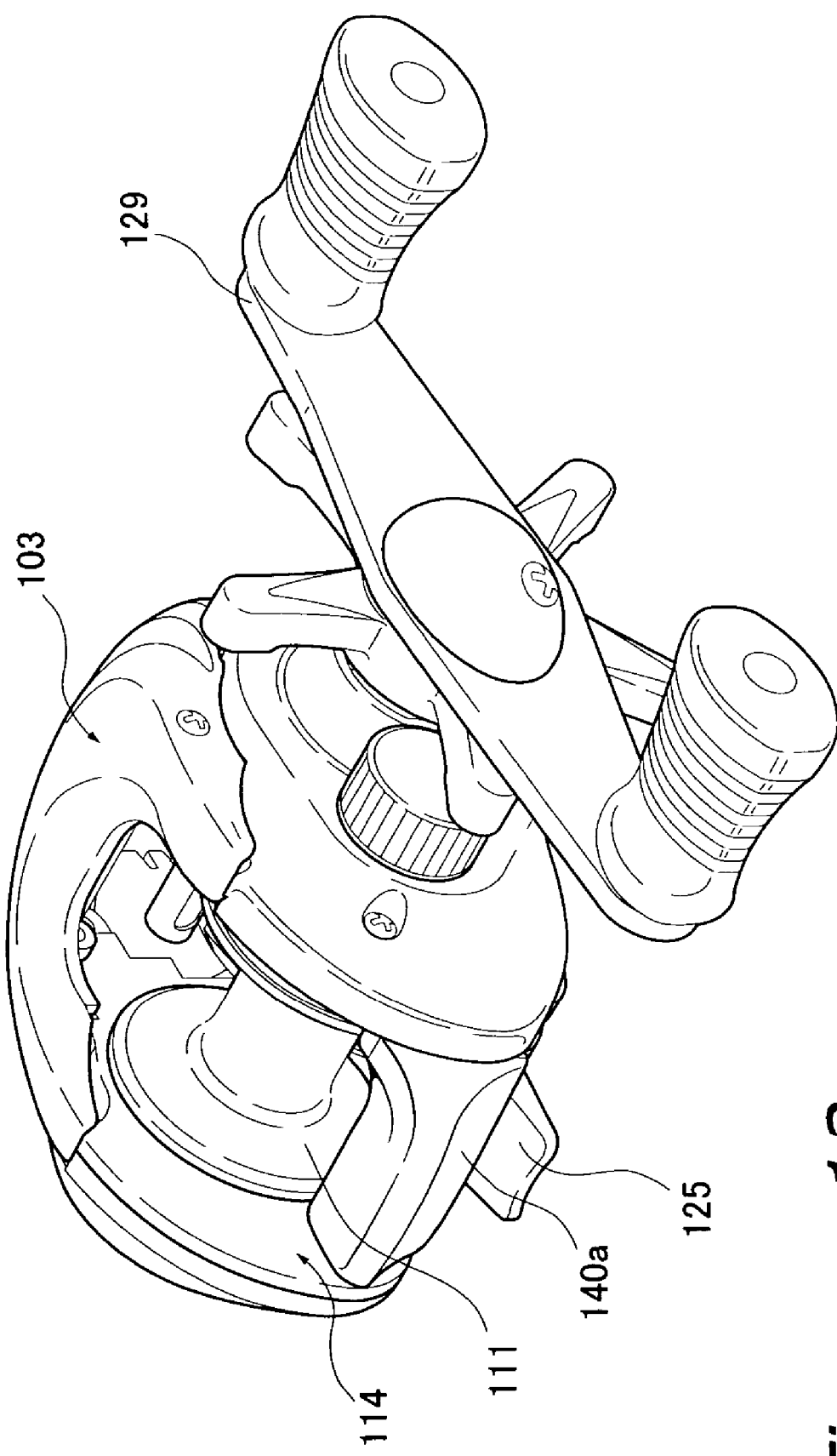
FIG. 12 is an oblique view of a dual bearing reel according to the fourth embodiment of the present invention.

As shown in FIG. 12, a dual bearing reel in accordance with a fourth embodiment of the present invention is mounted to a fishing rod and winds fishing line around a shaft that is perpendicular to the fishing rod, and includes a basic unit 114 and a decorative cover portion 103 that can be mounted to the basic unit 114.

Figure 13:
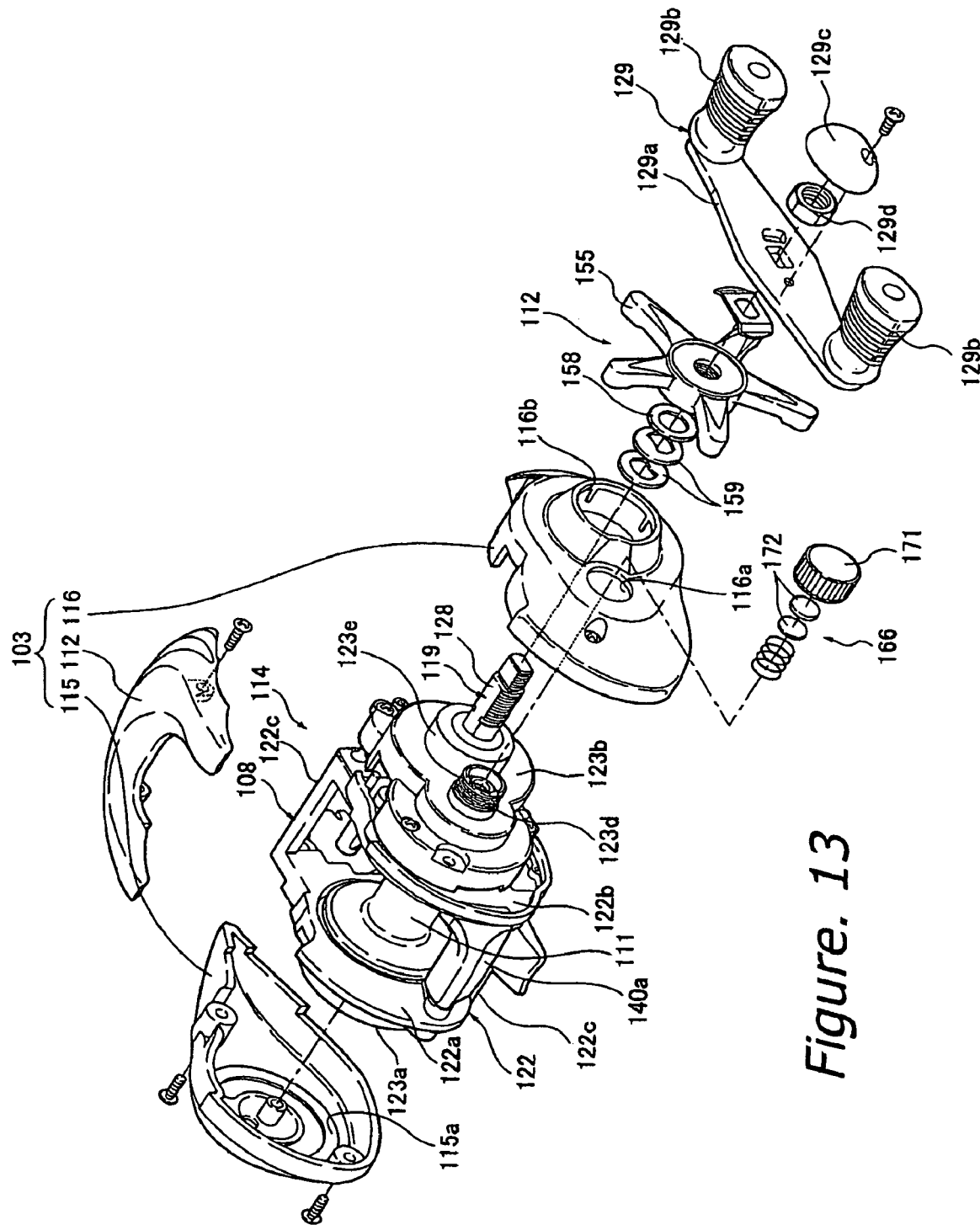
FIG. 13 is an exploded oblique view showing the basic unit and the cover portions of the dual bearing reel of FIG. 12 according to the fourth embodiment of the present invention.
Figure 14:
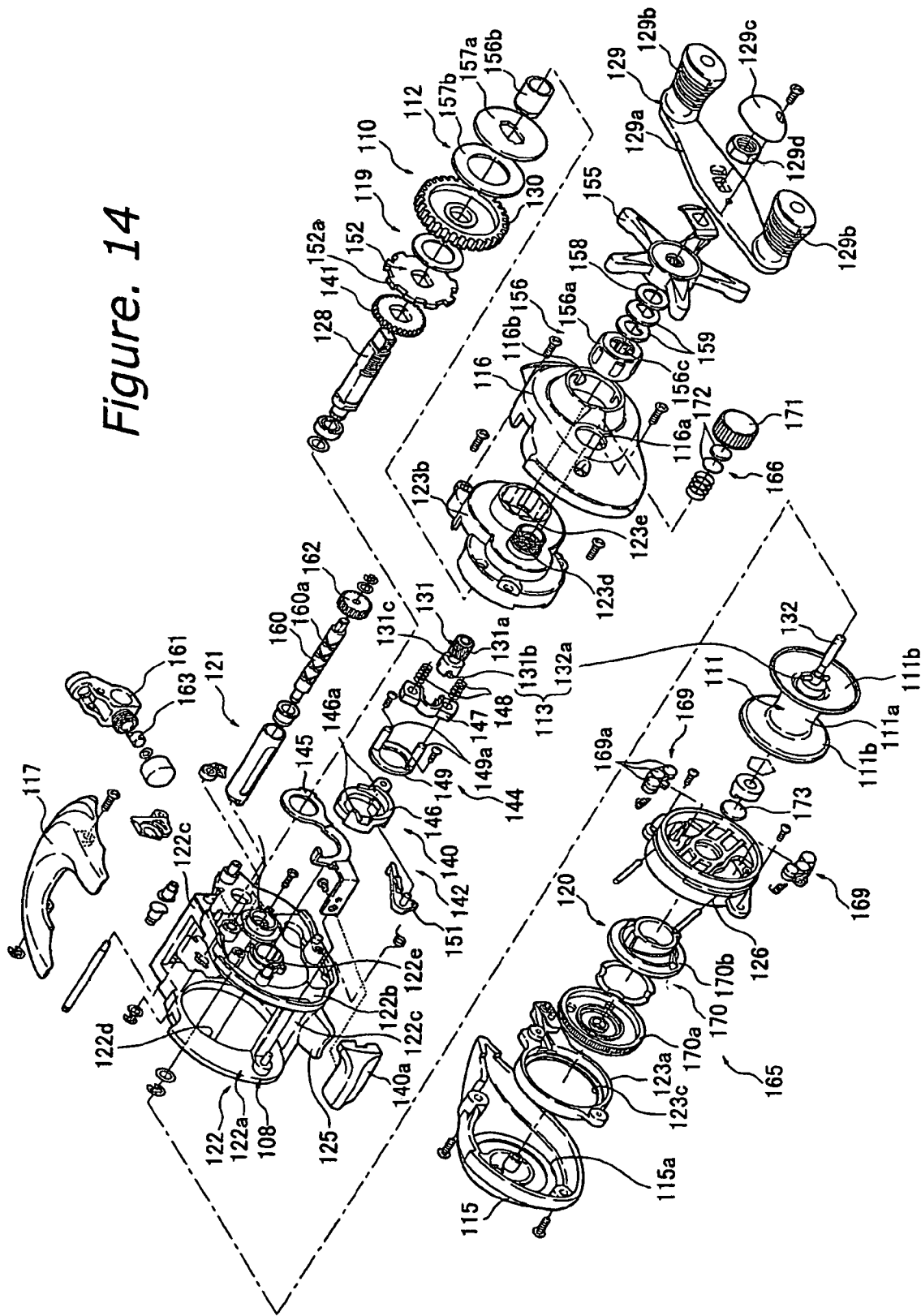
FIG. 14 is an exploded oblique view showing the component parts of the dual bearing reel of FIG. 12 according to the fourth embodiment of the present invention.

As shown in FIGS. 13 and 14, the basic unit 114 includes a reel body 108 that serves as an installation frame, a spool 111 around which fishing line is wound, a spool driving mechanism 119 for rotatively driving the spool 111, a drag mechanism 112, a level winding mechanism 121, and a brake mechanism 120.

The spool 111, the spool driving mechanism 119, the level winding mechanism 121, and the brake mechanism 120 are installed in the reel body 108 such that they function in cooperation with each other. The reel body 108 includes a main frame 122, third and fourth side plates 123a, 123b, and a brake case 126. The main frame 122 is mounted to the fishing rod, and includes first and second side plates 122a, 122b that are spaced apart from each other and have the spool 111 mounted therebetween. The third and fourth side plates 123a, 123b are each detachably installed on the outer sides of the first and second side plates 122a, 122b in the spool shaft direction. The brake case 126 is detachably mounted to the first side plate 122a. The spool 111, the spool driving mechanism 119, the drag mechanism 112, the level winding mechanism 121, and the brake mechanism 120 are installed in the reel body 108 such that they function in cooperation with each other.

The spool 111 is disposed between the first side plate 122a and the second side plate 122b, and the level winding mechanism 121 is disposed in front of the spool 111. A space that accommodates the brake mechanism 120 is formed in between the first side plate 122a and the third side plate 123a, and the brake mechanism 120 is positioned and supported in this space. A space that accommodates the spool driving mechanism 119 and the drag mechanism 112 is formed in between the second side plate 122b and the fourth side plate 123b, and the spool driving mechanism 119 and the drag mechanism 112 are positioned and supported in this space.

A circular opening 122d is formed in the first side plate 122a. The circular opening 122d is sized so that the spool 111 can pass therethrough. The brake mechanism 120 is installed in the opening 122d. In addition, the brake case 126 rotatively supports one end of a spool shaft 132, and is detachably mounted in the opening 122d by a bayonet structure. The brake case 126 is fixed to the third side plate 123a with screws. Thus, the third side plate 123a is detachably mounted to the first side plate 122a via the brake case 126. In addition, a through hole (not shown in the figures) for mounting the level winding mechanism 121 is formed in the first side plate 122a.

A first boss 122e and a second boss 122f are formed in the second side plate 122b. The spool shaft 132 fixed in the center of the spool 111 passes through the first boss 122e, and the second boss 122f supports a handle shaft 128 (noted below) of the spool driving mechanism 119. In addition, a through hole for mounting the level winding mechanism 121 is formed in the second side plate 122b.

A long rod mounting leg 125 for mounting the reel to the fishing rod is formed on the lower side of a connecting portion 122c, and extends from front to back.

The third side plate 123a has a planar shape, and is provided in order to rotatively mount the brake mechanism 120. The third side plate 123a includes a circular opening 123c that is capable of exposing an operation dial 170a (noted below) of the brake mechanism 120. Because the third side plate 123a is not necessary to determine the decorative design of the reel, the third side plate 123a needs to be sized only to be just large enough to fulfill its functions.

Rather than having smoothly curved side surfaces, the fourth side plate 123b has stepped planar surfaces that are shaped to easily maintain the strength and precision of the fourth side plate 123b. This is because the fourth side plate 123b is also not needed to determine the decorative design of the reel. The fourth side plate 123b is fixedly coupled to the second side plate 122b with screws. The fourth side plate 123b has the same function as a conventional cover member, and includes a first boss 123d through which the handle shaft 128 passes and a second boss 123d in which one end of the spool shaft 132 is disposed.

Cover portion 103 is, for example, made from a synthetic resin that is easily plated with a comparatively hard resin such as an acrylic resin or the like, and is provided primarily for decorative use. Thus, the cover portion 103 has almost no function as a means of supporting or positioning various components mounted inside the reel. The basic unit 114 is constructed such that it can function as a dual bearing reel even if the cover portion 103 is not mounted to the basic unit 114. The cover portion 103 includes a first cover member 115, a second cover member 116, and a front cover member 117. The first cover member 115 is fixedly coupled to the first side plate 122a with screws such that the first cover member 115 covers the exterior of the third side plate 123a. The second cover member 116 is fixedly coupled to the second side plate 122b such that the second cover member 116 covers the exterior of the fourth side plate 123b. The front cover member 117 is fixedly coupled to both side plates 122a, 122b such that the front cover member 117 covers the upper front of the main frame 122. Note that the first cover member 115 and the second cover member 116 may be screwed to the third and fourth side plates 123a, 123b instead of the first and second side plates 122a, 122b.

In order to determine the decorative design of the reel, the first cover member 115 is formed in a shape in which the front portion thereof is slightly pointed and the rear portion thereof is rounded. In addition, the first cover member 115 as a whole is smoothly curved in a convex shape, with the curve extending outward in the axial direction about the axial center of the spool shaft 132. A circular arc shaped opening 115*a* is formed in the first cover member 115, and serves to expose a brake operation portion of the brake mechanism 120 to the exterior of the reel. Like with the first cover member 115, in order to determine the decorative design of the reel, the second cover member 116 is formed in a shape in which the tip thereof is slightly pointed. The second cover member 116 includes a first through hole 116*a* and a second through hole 116*b*. The first boss 123*d* of the fourth side plate 123*b* passes through the first through hole 116*a*, and both the second boss 123*d* and the handle shaft 128 mounted to the second boss 123*d* pass through the second through hole 116*b*. In order to improve the decorative design, the portion which forms the second through hole 116*b* is formed to project outward in a taper shape so as to cover the second boss 123*d*.

As shown in FIG. 14, the spool 111 includes a cylindrical bobbin trunk 111*a*, and a pair of large diameter flange portions 111*b*, 111*c* that are formed integrally with the bobbin trunk 111*a* on both sides thereof. The spool shaft 132 passes through the center of the spool 111 and is non-rotatably mounted thereto. The spool shaft 132 is rotatively mounted to the reel body 108.

The spool driving mechanism 119 includes a rotation transmission mechanism 110, a clutch mechanism 113, and a clutch switching mechanism 140. The rotation transmission mechanism 110 includes the handle shaft 128 on one end of which a handle assembly 129 is mounted, and transmits the rotation of the handle assembly 129 to the spool 111. The clutch mechanism 113 is arranged along the transmission path of the rotation transmission mechanism 110, and switches the spool 111 between a freely rotatable state and a line winding state. The clutch switching mechanism 140 serves to turn the clutch mechanism 113 on or off.

The handle assembly 129 includes a handle arm 129*a* that is non-rotatably mounted on a tip of the handle shaft 128, and handle grips 129*b* that are rotatively mounted on both ends of the handle arm 129*a*. The handle arm 129*a* is fixedly coupled to the tip of the handle shaft 128 by a nut 129*d*. The nut 129*d* is prevented from rotating by a rotation prevention member 129*c* that is attached to the handle arm 129*a* with a screw.

The handle shaft 128 is rotatively mounted on the second boss 122*f* of the second side plate 122*b*, and is prohibited from rotating in the direction in which fishing line is reeled out by a roller-type one-way clutch 156 that is mounted to the second boss 123*d* of the fourth side plate 123*b*. The one-way clutch 156 includes an outer ring 156*a*, an inner ring 156*b*, and rollers 156*c*. The outer ring 156*a* is non-rotatably mounted to the second boss 123*d*. The inner ring 156*b* non-rotatably mounted to the handle shaft 128 via the drag mechanism 112 and faces the outer ring 156*a*. The rollers 156*c* are disposed between both rings 156*a*, 156*b* such that they can come into contact with both rings 156*a*, 156*b*.

The rotation transmission mechanism 110 includes a main gear 130, a pinion gear 131, and a drive gear 141. The main gear 130 is rotatively disposed on the handle shaft 128. The pinion gear 131 meshes with the main gear 130. The drive gear 141 is non-rotatably mounted to the handle shaft 128. Rotation from the handle shaft 128 to the main gear 130 is transmitted via the drag mechanism 112. The pinion gear 131 is disposed such that it is both rotatable and axially movable relative to the spool shaft 132. The pinion gear 131 is disposed on the inner side of the first boss 122*e* of the second side plate 122*b*. The pinion gear 131 includes gear teeth 131*a*, an engagement recess 131*b*, and a neck portion 131*c*. The gear teeth 131*a* are formed on one end of the pinion gear 131, and mesh with the main gear 130. The engagement recesses 131*b* are formed on the other end of the pinion gear 131 and form the clutch mechanism 113. The neck portion 131*c* is formed in between the gear teeth 131*a* and the engagement recesses 131*b*, has a small diameter, and engages with the clutch switching mechanism 140. A drive gear 141 is provided to transmit the rotation of the handle assembly 129 to the level winding mechanism 121.

The clutch mechanism 113 includes a clutch pin 132*a* that is mounted on the spool shaft 132, and the engagement recesses 131*b* that are formed in the pinion gear 131. The clutch pin 132*a* is mounted to the spool shaft 132 and passes through the spool shaft 132 in the radial direction. Four engagement recesses 131*b* are formed in the pinion gear 131, and extend inward from one end surface of the pinion gear 131 toward the other end thereof. When the clutch pin 132*a* engages with the engagement recesses 131*b*, the clutch mechanism 113 will be in a clutch-on state and the spool 111 will be capable of winding in fishing line. When the pinion gear 131 moves outward in the axial direction away from the spool 111 and is disengaged therefrom, the clutch mechanism 113 will be in the clutch-off state and the spool 111 will be capable of free rotation.

The clutch switching mechanism 140 includes a clutch operation member 140*a*, a clutch movement mechanism 144, and a clutch return mechanism 142. The clutch operation member 140*a* serves to turn the clutch mechanism 113 on and off. The clutch movement mechanism 144 moves the clutch mechanism 113 to the on and off positions by operation of the clutch operation member 140*a*. The clutch return mechanism 142 returns the clutch mechanism 113 to the clutch-on state from the clutch-off state when the handle assembly 129 is rotated in the line winding direction.

The clutch operation member 140*a* is disposed on the rear portion of the reel body 108 on the first and second side plates 122*a*, 122*b*, and moves both toward and away from the fishing rod mount.

The clutch movement mechanism 144 includes a clutch plate 145, a clutch cam 146, a clutch yoke 147, and two coil springs 148. The clutch plate 145 is mounted to the clutch operation member 140*a*, and is pivotably mounted to the second side plate 122*b*. The clutch cam 146 engages with the clutch plate 145 and rotates. The clutch yoke 147 is pushed outward in the axial direction of the spool by the clutch cam 146. The two coil springs 148 bias the clutch yoke 147 inward in the axial direction. The clutch plate 145 is pivotably mounted to the second boss 122*f* of the second side plate 122*b* with the rotation of the handle shaft 128. The clutch cam 146 is rotatively mounted to the first boss 122*e* with the rotation of the spool shaft 132. The clutch cam 146 rotates when the clutch plate 145 pivots, and the clutch cam 146 is linked to the clutch plate 145 such that the clutch plate 145 pivots when the clutch cam 146 rotates. A pair of cam projections 146*a* is formed in the clutch cam 146, and push the clutch yoke 147 axially outward, i.e., the clutch-off direction, by rotational movement. The clutch yoke 147 is a member that engages with the neck portion 131*c* on the pinion gear 131, and is mounted such that it is moveable in the spool shaft 132 direction by a guide member 149 that includes two guide shafts 149*a*. The guide member 149 is screwed to the periphery of the first boss 122*e*, and prevents the clutch cam 146 from falling off of the first boss 122*e*. The tips of the guide shafts 149*a* come into contact with the inner surface of the fourth side plate 123*b*. The coil springs 148 are disposed in the compressed state around the outer peripheries of the guide shafts 149*a*, and bias the clutch yoke 147 inward in the axial direction, i.e., in the clutch-on direction. Here, when the clutch plate 145 pivots in the counterclockwise direction in FIG. 14, pushing the clutch operation member 140a downward, the clutch cam 146 will be rotated in the same direction, and the clutch yoke 147 will be pushed outward in the axial direction to move the pinion gear 131 into the clutch-off direction. This places the clutch mechanism 113 in the clutch-off state, and the spool 111 will be capable of free rotation. When the clutch operation member 140a is pushed upward, the pushing pressure applied by the clutch cam 146 will be released, and the clutch yoke 147 will be biased inward in the axial direction by the coil springs 148, and the clutch yoke 147 will be moved into the clutch-on direction to place the clutch mechanism 113 in the clutch-on state. This places the spool 111 into the line winding state, and when the handle assembly 129 rotates in the line winding direction, the fishing line is wound around the spool 111 and the drag mechanism 112 can be operated.

The clutch return mechanism 142 includes a return pawl 151 that is pivotably mounted to the clutch cam 146, and a ratchet 152 that is non-rotatably mounted to the handle assembly 129. When the clutch cam 146 rotates to the clutch off position, the tip of the return pawl 151 is disposed near the outer periphery of the ratchet 152. A plurality of teeth 152a that are capable of pushing the return pawl 151 are formed on the outer periphery of the ratchet 152, and the return pawl 151 is pushed by the teeth 152a when the handle shaft 128 rotates in the line winding direction. Thus, the clutch cam 146 rotates to the clutch-on position and the clutch mechanism 113 returns to the clutch-on state.

The drag mechanism 112 brakes the rotation of the spool 111 in the line-releasing direction when the clutch mechanism 113 is in the clutch-on state. The drag mechanism 112 includes a star drag 155 for operating the drag, and two drag disks 157a, 157b that are pushed by the star drag 155. The star drag 155 is disposed in the vicinity of the handle arm 129a, and is screwed onto the handle shaft 128. The drag disk 157a is non-rotatably mounted to the handle shaft 128, and is pushed by the star drag 155 via a washer 158, two plate springs 159, and the inner ring 156b of the one-way clutch 156. The inner ring 156b non-rotatably engages with the drag disk 157b, and the inner ring 156b is non-rotatable on the handle shaft 128. The drag disk 157b is disposed adjacent to the main gear 130. The main gear 130 is mounted on the handle shaft 128 so that the main gear 130 is not movable in the pushing direction (toward the left in FIG. 14). Because of this, the drag strength of the drag mechanism 112 will increase when the star drag 155 rotates in the clockwise direction.

The level winding mechanism 121 includes a spiral shaft 160 and a fishing line guide 161. The spiral shaft 160 is rotatively supported on both ends of the spiral shaft 160 by the first and second side plates 122a, 122b, and is disposed parallel to the spool shaft 132. The fishing line guide 161 engages with the spiral shaft 160, and reciprocates back and forth along the spool shaft 132. A driven gear 162 that meshes with the drive gear 141 is mounted on one end of the spiral shaft 160, and the rotation of the handle shaft 128 in the line winding direction is transmitted to the spiral shaft 160. Intersecting spiral grooves 160a are formed on the outer peripheral surface of the spiral shaft 160, and an engagement member 163 that engages with the spiral grooves 160a is rotatively mounted on the fishing line guide 161.

The brake mechanism 120 brakes the spool 111 without regard to the direction in which the spool 111 rotates. The brake mechanism 120 includes a magnetic brake mechanism 165 that brakes the spool 111 with magnetic force, and a casting control mechanism 166 that grasps and brakes both ends of the spool shaft 132.

The magnetic brake mechanism 165 includes a pair of magnet attachment portions 169 that are pivotably mounted on the brake case 126, and a brake operation portion 170 that pivots the magnet attachment portions 169. A plurality of magnets 169a is mounted on the magnet attachment portions 169. The magnet attachment portions 169 are pivotably mounted to the brake case 126 so that the magnets 169a come in contact with and are drawn away from the flange portions 111b of the spool 111. The brake operation portion 170 includes an operation dial 170a that is rotatively supported by the third side plate 123a, and a rotating cam mechanism 170b that pivots the magnet attachment portions 169 in association with the rotation of the operation dial 170a. An operation pin (not shown in the figures) is formed on the operation dial 170a such that the operation pin projects outward via the opening 115a from a position that is offset from the rotational center. The operation dial 170a can be operated from the exterior of the reel by the operation pin. The magnets 169a can be brought into contact with and moved away from the flange portions 111b of the spool 111 by operation of the operation dial 170a, and the braking force can be adjusted by strengthening or weakening the magnetic force applied to the spool 111.

The casting control mechanism 166 includes an operation knob 171, friction disks 172, and a friction disk 173. The operation knob 171 is screwed onto the first boss 123d of the fourth side plate 123b. The friction disks 172 are accommodated in the operation knob 171, and the friction disk 173 is accommodated in the brake case 126. The friction disks 172, 173 can be brought into contact with both ends of the spool 111 when the spool 111 is mounted to the reel unit. In this state, the braking power that is applied to the spool 111 can be adjusted by rotating the operation knob 171.

As shown in FIG. 13, if decorative design is not taken into consideration, the basic unit 114 having a star drag 155 and a handle assembly 129 mounted on the tip of the handle shaft 128 can have almost all of the functions of the dual bearing reel constructed as noted above when all of the mechanisms (except a portion of the drag mechanism 112) are combined together inside the reel body 108. However, the third and fourth side plates 123a, 123b are not visually attractive because they were designed with only a view to being in proper positions and supporting the internal mechanisms, without taking into consideration their decorative appearances. Accordingly, the first and second cover members 115, 116 and the front cover member 117 are mounted on the basic unit 114. Note that because the star drag 155 and the handle assembly 129 will obviously be in the way, the star drag 155 and the handle assembly 129 must be mounted after the second cover member 116 is mounted. As shown in FIG. 12, this will provide a dual bearing reel having a smart and elegant decorative design. Moreover, if the decorative design of the cover portion 103 changes, it will also be possible to manufacture dual bearing reels having a variety of different designs.

Here, instead of a conventional cover member that is mounted to the exterior of the main frame 122 having the first and second side plates 122a, 122b, it becomes possible to support and position the spool 111 and spool driving mechanism 119 that perform the basic operations of the dual bearing reel by mounting the third and fourth side plates 123a, 123b to the reel body 108. Because of this, the first and second cover members 115, 116 do not need to perform functions such as supporting the spool 111 and positioning the spool driving mechanism 119, there will be no additional limitations on the design as in the case of conventional dual bearing reels. Thus, it will become possible to freely design these components as decorative design components. Thus, the important functions of the dual bearing reel can be retained by the basic unit 114, while the decorative appearance of the dual bearing reel can be freely and easily designed with the cover portion 103. In addition, a plurality of different types of decorative designs is made possible by changing the decorative design of the cover portion 103, and the establishment of shared components is made possible by using the basic unit 114.

Other Embodiments (a) In the aforementioned embodiment, an example was described in which the reel unit of the dual bearing reel is not round. However, the present invention can also be applied to a dual bearing reel that is round-shaped.

(b) In the aforementioned embodiment, the structural elements of the reel body 108 and the cover portion 103 was fixedly coupled with screws, but other fixing structures such as resilient latches may also be used.

(c) In the aforementioned embodiment, a dual bearing reel was illustrated that uses a star drag to adjust the drag force in the handle shaft. However, the present invention can be applied in a lever type dual bearing reel, in which a brake lever is mounted on the spool shaft.

According to the embodiments of the present invention described above, by attaching third and fourth side plates, instead of conventional cover members which are mounted to the exterior of a main frame, to an installation frame that has first and second side plates, it becomes possible to support and position a spool and spool driving mechanism that perform the basic operations of a dual bearing reel on. Because of this, the first and second cover members do not need to perform functions such as supporting the spool and positioning the spool driving mechanism. Accordingly, there will be no additional limitations on the design as in the case of the prior art. Thus, it will become possible to freely design these components as decorative design components. Therefore, the important functions of the dual bearing reel can be retained by the basic unit, while the decorative appearances of the dual bearing reel can be freely and easily performed by the cover members. In addition, a plurality of different types of decorative designs is possible by changing the decorative design of the cover members. Furthermore, it is possible to establish shared components by using the basic unit.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The terms of degree such as "substantially," "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2001-321593. The entire disclosure of Japanese Patent Application No. 2001-321593 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A dual bearing reel adapted to be attached to a fishing rod, comprising:
    a basic unit including
        a spool for winding or reeling out a fishing line by being rotated in normal or reverse direction,
        a spool driving mechanism for driving said spool, and
        an attachment frame to which said spool and said spool driving mechanism are attached with said spool and said spool driving mechanism being allowed to function in cooperation with each other; and
    an outer plate portion that is attached to said attachment frame of said basic unit to cover a space defined by said attachment frame, said outer plate portion being attached to said attachment frame but not to said spool or said spool driving mechanism, such that said attachment frame allows said spool and said spool driving mechanism to function in cooperation with each other without said outer plate portion being attached to said attachment frame.

2. The dual bearing reel as set forth in claim 1, wherein said basic unit further includes
    a braking mechanism for applying a brake to the rotation of said spool, and
    a level winding mechanism for winding the fishing line uniformly on said spool; and
    said braking mechanism and said level winding mechanism are attached to said attachment frame such that said braking mechanism and said level winding mechanism function in cooperation with each other.

3. The dual bearing reel as set forth in claim 1, wherein said outer plate portion has a first engagement portion;
    said attachment frame has a second engagement portion; and
    said outer plate portion is detachably attached to said attachment frame by engaging said first and second engagement portions.

4. The dual bearing reel as set forth in claim 3, wherein said outer plate portion further has a body portion;
    said first engagement portion includes a pin projecting from said body portion; and
    said second engagement portion includes an engagement bore which engages said pin.

5. The dual bearing reel as set forth in claim 3, wherein said outer plate portion is detachably attached to said attachment frame by engaging said first and second engagement portions through an engagement member.

6. The dual bearing reel as set forth in claim 5, wherein said outer plate portion further has a body portion;
    said first engagement portion includes a fixed boss formed on said body portion;
    said second engagement portion includes an engagement bore; and said engagement member includes a screw that is screwed into said engagement bore and said fixed boss.

7. The dual bearing reel as set forth in claim 3, wherein said attachment frame includes a pair of side portions, a cross member that bridges over said pair of side portions, and a leg portion that is attachable to the fishing rod.

8. The dual bearing reel as set forth in claim 7, wherein said second engagement portion is formed on said side portions.

9. The dual bearing reel as set forth in claim 7, wherein said second engagement portion is formed on said cross member.

10. The dual bearing reel as set forth in claim 1, wherein said attachment frame includes a pair of side portions, a cross member that bridges over said pair of side portions, and a leg portion that is attachable to the fishing rod.

11. The dual bearing reel as set forth in claim 10, wherein said cross member and said pair of side portions are formed as a one-piece unitary member.

12. The dual bearing reel as set forth in claim 1, wherein said outer plate portion includes first through third outer plate members.

13. The dual bearing reel as set forth in claim 12, wherein said first outer plate member has a third engagement portion, and
said second outer plate member has a fourth engagement portion that engages said third engagement portion to couple said first and second outer plate members.

14. The dual bearingreel as set forth in claim 12, wherein said outer plate portion further includes a fourth outer plate member.

15. The dual bearing reel as set forth in claim 1, wherein said outer plate portion is made from ABS resin.

16. The dual bearing reel as set forth in claim 1, wherein said spool driving mechanism includes a clutch mechanism and a drag mechanism, said clutch mechanism operatively taking one of active and inactive states, said drag mechanism restrictively allowing reverse rotation of said spool when said clutch mechanism is in the active state.

17. A dual bearing reel which is mounted on a fishing rod and adapted to wind fishing line around an axis that is perpendicular to the fishing rod, the dual bearing reel comprising:
a basic unit having
a spool for taking up fishing line,
a spool driving mechanism for braking the rotation of said spool, and
an installation frame that includes a main frame which is adapted to be mounted to the fishing rod and has first and second side plates that are spaced apart from each other with said spool being mounted therebetween, a plurality of connectors that links said first and second side plates together, and third and fourth side plates that are each detachably mounted to outer sides of said first and second side plates, said spool and said spool driving mechanism being mounted on said installation frame with said spool and said spool driving mechanism being allowed to function in cooperation with each other; and
a decorative cover portion having first and second cover members that are each detachably mounted to said installation frame such that said first and second cover members cover exteriors of said third and fourth side plates, said decorative cover portion being attached to said installation frame but not to said spool or said spool driving mechanism, such that said installation frame allows said spool and said spool driving mechanism to function in cooperation with each other without said decorative cover portion being attached to said installation frame.

18. The dual bearing reel disclosed in claim 17, wherein said spool driving mechanism includes:
a rotation transmission mechanism that includes a handle shaft having a handle mounted on one end thereof, such that rotation of said handle is transmitted to said spool,
a clutch mechanism arranged operatively between said handle and said spool, said clutch mechanism being configured to switch said spool between a freely rotatable state and a line winding state, and
a clutch switching mechanism configured to switch said clutch mechanism between a clutch-off state in which said spool is in said freely rotatable state, and a clutch-on state in which said spool is in said line winding state.

19. The dual bearing reel disclosed in claim 17, wherein said basic unit further includes:
a drag mechanism that brakes rotation of said spool when said spool rotates to reel out the fishing line, and
a level winding mechanism for winding fishing line in an orderly manner on said spool; and
said drag mechanism and said level winding mechanism are installed on said installation frame such that said drag mechanism and said level winding mechanism function in cooperation with each other.

20. The dual bearing reel disclosed in claim 17, wherein said basic unit further includes a brake mechanism that brakes said spool regardless of a direction in which the spool rotates; and
said brake mechanism is mounted between said first side plate and said third side plate of said basic unit.

21. The dual bearing reel disclosed in claim 17, wherein said second side plate and said fourth side plate are disposed with a space which accommodates said spool driving mechanism being formed therebetween.

22. The dual bearing reel disclosed in claim 17, wherein said decorative cover portion further includes a front cover that covers a side of the reel opposite a side to which the fishing rod is mounted.

* * * * *